US012042985B2

(12) United States Patent
Hirschsohn et al.

(10) Patent No.: US 12,042,985 B2
(45) Date of Patent: Jul. 23, 2024

(54) ADDITIVE MANUFACTURING USING REINFORCED MATERIALS

(71) Applicant: Stratasys Ltd., Rehovot (IL)

(72) Inventors: Yaniv Hirschsohn, Rehovot (IL); Lior Zonder, Tel-Aviv (IL); Ohad Shitrit, Herzliya (IL); Cesar M. Manna, Rehovot (IL)

(73) Assignee: Stratasys Ltd., Rehovot (IL)

( * ) Notice: Subject to any disclaimer, the term of this patent is extended or adjusted under 35 U.S.C. 154(b) by 371 days.

(21) Appl. No.: 17/418,973

(22) PCT Filed: Dec. 26, 2019

(86) PCT No.: PCT/IL2019/051417
§ 371 (c)(1),
(2) Date: Jun. 28, 2021

(87) PCT Pub. No.: WO2020/136654
PCT Pub. Date: Jul. 2, 2020

(65) Prior Publication Data
US 2022/0111585 A1    Apr. 14, 2022

Related U.S. Application Data

(60) Provisional application No. 62/785,286, filed on Dec. 27, 2018.

(51) Int. Cl.
*B29C 64/153*        (2017.01)
*B29C 64/314*        (2017.01)
(Continued)

(52) U.S. Cl.
CPC .......... *B29C 64/153* (2017.08); *B29C 64/314* (2017.08); *B33Y 10/00* (2014.12);
(Continued)

(58) Field of Classification Search
CPC ..... B29C 64/153; B29C 64/314; B33Y 10/00; B33Y 70/00; B33Y 80/00; B33Y 30/00
See application file for complete search history.

(56) References Cited

U.S. PATENT DOCUMENTS 5,834,529 A * 11/1998 Reese ................ C08G 18/12
521/84.1
6,259,962 B1    7/2001 Gothait
(Continued)

FOREIGN PATENT DOCUMENTS

CN    107533296    1/2018
EP    2436510    4/2012
(Continued)

OTHER PUBLICATIONS

Communication Pursuant to Article 94(3) EPC Dated May 4, 2023 From the European Patent Office Re. Application No. 19832214.1 (4 Pages).
(Continued)

*Primary Examiner* — Nahida Sultana

(57) ABSTRACT

Formulations usable in additive manufacturing of a three-dimensional object, which comprise a reinforcing material such as silica particles in an amount of from 10 to 30%, or from 15 to 20%, by weight, of the total weight of the formulation, and a designed combination of curable materials as described in the specification, is provided. Additive manufacturing of three-dimensional objects made of such a formulation and featuring enhanced mechanical properties, and objects obtained thereby are also provided.

20 Claims, 16 Drawing Sheets

(51) Int. Cl.
  B33Y 10/00    (2015.01)
  B33Y 70/00    (2020.01)
  B82Y 30/00    (2011.01)
  B29K 33/00        (2006.01)
  B29K 509/00       (2006.01)
  B33Y 80/00        (2015.01)

(52) U.S. Cl.
  CPC .......... B33Y 70/00 (2014.12); *B29K 2033/08* (2013.01); *B29K 2509/00* (2013.01); *B33Y 80/00* (2014.12); *B82Y 30/00* (2013.01)

(56) References Cited

U.S. PATENT DOCUMENTS

| | | | |
|---|---|---|---|
| 6,569,373 | B2 | 5/2003 | Napadensky |
| 6,658,314 | B1 | 12/2003 | Gothait |
| 6,850,334 | B1 | 2/2005 | Gothait |
| 6,863,859 | B2 | 3/2005 | Levy |
| 7,183,335 | B2 | 2/2007 | Napadensky |
| 7,209,797 | B2 | 4/2007 | Kritchman et al. |
| 7,225,045 | B2 | 5/2007 | Gothait et al. |
| 7,300,619 | B2 | 11/2007 | Napadensky et al. |
| 7,500,846 | B2 | 3/2009 | Eshed et al. |
| 7,991,498 | B2 | 8/2011 | Kritchman |
| 9,031,680 | B2 | 3/2015 | Napadensky |
| 9,227,365 | B2 | 1/2016 | Dikovsky et al. |
| 9,872,828 | B2 * | 1/2018 | Feng ................ C08G 77/26 |
| 11,491,711 | B2 * | 11/2022 | Holt ................... C08F 2/50 |
| 11,597,786 | B2 * | 3/2023 | Nishimoto ........ C08F 220/1804 |
| 2010/0191360 | A1 | 7/2010 | Napadensky et al. |
| 2014/0167300 | A1 | 6/2014 | Lee |
| 2016/0339643 | A1 | 11/2016 | Dikovsky et al. |
| 2017/0173865 | A1 | 6/2017 | Dikovsky et al. |
| 2017/0259488 | A1 | 9/2017 | Napadensky |
| 2018/0100075 | A1 | 4/2018 | Chopra et al. |

FOREIGN PATENT DOCUMENTS

| | | |
|---|---|---|
| EP | 3309225 | 4/2018 |
| WO | WO 2005/045525 | 5/2005 |
| WO | WO 2009/013751 | 1/2009 |
| WO | WO 2013/128452 | 9/2013 |
| WO | WO 2016/063282 | 4/2016 |
| WO | WO 2016/125170 | 8/2016 |
| WO | WO 2017/068590 | 4/2017 |
| WO | WO 2017/134672 | 8/2017 |
| WO | WO 2017/134673 | 8/2017 |
| WO | WO 2017/134674 | 8/2017 |
| WO | WO 2017/134676 | 8/2017 |
| WO | WO 2017/187434 | 11/2017 |
| WO | WO 2017/207366 | 12/2017 |
| WO | WO 2017/208238 | 12/2017 |
| WO | WO 2018/055521 | 3/2018 |
| WO | WO 2018/055522 | 3/2018 |
| WO | WO 2020/136654 | 7/2020 |
| WO | WO 2020/136654 A8 | 9/2020 |

OTHER PUBLICATIONS

English Summary Dated Aug. 25, 2023 of Notification of Office Action Dated Aug. 11, 2023 From the State Intellectual Property Office of the People's Republic of China Re. Application No. 201980089326.7. (1 page).

Translation Dated Aug. 10, 2023 of Notice of Reason(s) for Rejection Dated Jul. 4, 2023 From the Japan Patent Office Re. Application No. 2021-534923. (4 pages).

English Summary Dated Jul. 25, 2022 of Notification of Office Action and Search Report Dated Jul. 5, 2022 From the State Intellectual Property Office of the People's Republic of China Re. Application No. 201980089326.7. (1 Pages).

Notice of Reason(s) for Rejection Dated Jul. 4, 2023 From the Japan Patent Office Re. Application No. 2021-534923. (2 pages).

Notification of Office Action and Search Report Dated Aug. 11, 2023 From the National Intellectual Property Administration of the People's Republic of China Re. Application No. 201980089326.7 and Its Machine Translation Into English. (20 Pages).

Notification of Office Action Dated Feb. 24, 2023 From the State Intellectual Property Office of the People's Republic of China Re. Application No. 201980089326.7. (8 Pages).

Notification of Office Action and Search Report Dated Jul. 5, 2022 From the State Intellectual Property Office of the People's Republic of China Re. Application No. 201980089326.7. (9 Pages).

Translation Dated Mar. 27, 2023 of Notification of Office Action Dated Feb. 24, 2023 From the State Intellectual Property Office of the People's Republic of China Re. Application No. 201980089326.7. (13 pages).

International Search Report and the Written Opinion Dated Mar. 19, 2020 From the International Searching Authority Re. Application No. PCT/IL2019/051417. (10 Pages).

International Preliminary Report on Patentability Dated Jul. 8, 2021 From the International Bureau of WIPO Re. Application No. PCT/IL2019/051417. (7 Pages).

Translation Dated Sep. 7, 2023 of Notification of Office Action Dated Aug. 11, 2023 From the State Intellectual Property Office of the People's Republic of China Re. Application No. 201980089326.7. (16 pages).

Office Action Dated Dec. 19, 2023 From the Israel Patent Office Re. Application No. 284413. (3 Pages).

* cited by examiner

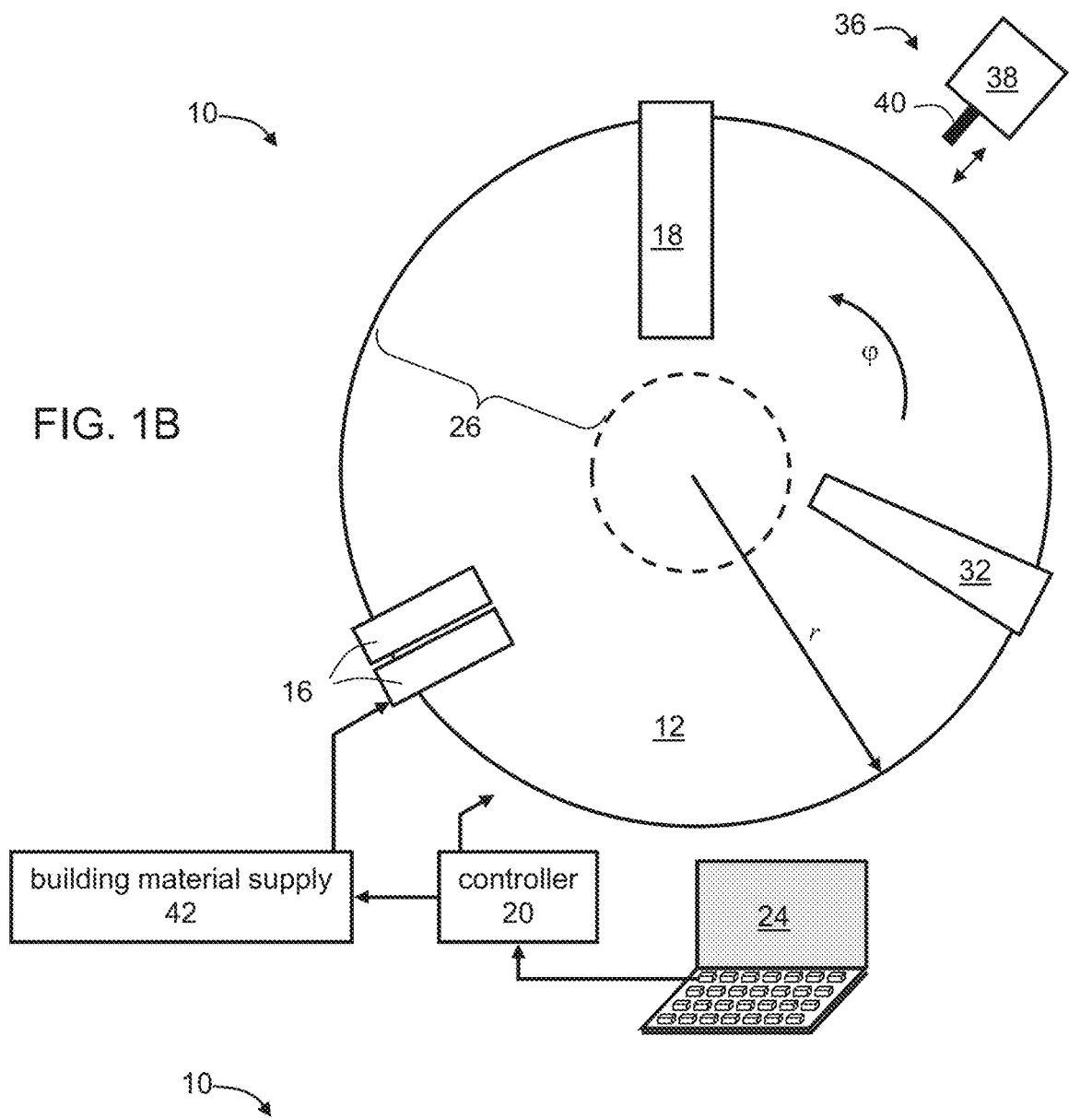
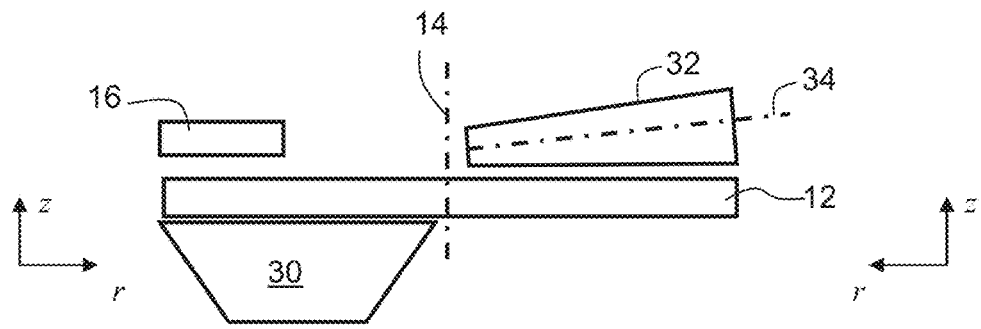

ADDITIVE MANUFACTURING USING REINFORCED MATERIALS

RELATED APPLICATION/S

This application is a National Phase of PCT Patent Application No. PCT/IL2019/051417 having International filing date of Dec. 26, 2019, which claims the benefit of priority under 35 USC § 119(e) of U.S. Provisional Patent Application No. 62/785,286 filed on Dec. 27, 2018. The contents of the above application are all incorporated by reference as if fully set forth herein in their entirety.

FIELD AND BACKGROUND OF THE INVENTION

The present invention, in some embodiments thereof, relates to additive manufacturing (AM), and, more particularly, but not exclusively, to novel formulations usable in AM of three-dimensional objects having in at least a portion thereof a reinforced material.

Additive manufacturing (AM) is a technology enabling fabrication of arbitrarily shaped structures directly from computer data via additive formation steps. The basic operation of any AM system consists of slicing a three-dimensional computer model into thin cross sections, translating the result into two-dimensional position data and feeding the data to control equipment which fabricates a three-dimensional structure in a layerwise manner.

Additive manufacturing entails many different approaches to the method of fabrication, including three-dimensional (3D) printing such as 3D inkjet printing, electron beam melting, stereolithography, selective laser sintering, laminated object manufacturing, fused deposition modeling and others.

Some 3D printing processes, for example, 3D inkjet printing, are being performed by a layer by layer inkjet deposition of building materials. Thus, a building material is dispensed from a dispensing head having a set of nozzles to deposit layers on a supporting structure. Depending on the building material, the layers may then be cured or solidified. Curing may be by exposure to a suitable condition, and optionally by using a suitable device.

The building material includes an uncured model material (also referred to as "uncured modeling material" or "modeling material formulation"), which is selectively dispensed to produce the desired object, and may also include an uncured support material (also referred to as "uncured supporting material" or "support material formulation") which provides temporary support to specific regions of the object during building and assures adequate vertical placement of subsequent object layers. The supporting structure is typically configured to be removed after the object is completed.

In some known inkjet printing systems, the uncured model material is a photopolymerizable or photocurable material that is cured, hardened or solidified upon exposure to ultraviolet (UV) light after it is jetted. The uncured model material may be a photopolymerizable material formulation that has a composition which, after curing, gives a solid material with mechanical properties that permit the building and handling of the three-dimensional object being built. The material formulation may include a reactive (curable) component and a photo-initiator. The photo-initiator may enable at least partial solidification of the uncured support material by curing with the same UV light applied to form the model material. The solidified material may be rigid, or may have elastic properties. The support material is formulated to permit fast and easy cleaning of the object from its support. The support material may be a polymer, which is water-soluble and/or capable of swelling and/or breaking down upon exposure to a liquid solution, e.g. water, alkaline or acidic water solution. The support material formulation may also include a reactive (curable) component and a photo-initiator similar to that used for the model material formulation.

In order to be compatible with most of the commercially-available print heads utilized in a 3D inkjet printing system, the uncured building materials are known to feature the following characteristics: a relatively low viscosity (e.g., Brookfield Viscosity of up to 50 cps, or up to 35 cps, preferably from 8 to 25 cps) at the working (e.g., jetting) temperature; Surface tension of from about 25 to about 55 Dyne/cm, preferably from about 25 to about 40 Dyne/cm; and a Newtonian liquid behavior and high reactivity to a selected curing condition, to enable fast solidification of the jetted layer upon exposure to a curing condition, of no more than 1 minute, preferably no more than 20 seconds.

The hardened modeling material which forms the final object typically exhibits heat deflection temperature (HDT) which is higher than room temperature, in order to assure its usability. Desirably, the hardened modeling material exhibits HDT of at least 35° C. For an object to be stable at variable conditions, a higher HDT is known to be desirable. In most cases, it is also desirable that the object exhibits relatively high Izod Notched impact, e.g., higher than 50 or higher than 60 J/m.

Various three-dimensional printing techniques exist and are disclosed in, e.g., U.S. Pat. Nos. 6,259,962, 6,569,373, 6,658,314, 6,850,334, 6,863,859, 7,183,335, 7,209,797, 7,225,045, 7,300,619, 7,500,846, 7,991,498 and 9,031,680 and U.S. Published Application No. 20160339643, all by the same Assignee, and being hereby incorporated by reference in their entirety.

Several additive manufacturing processes, including three-dimensional inkjet printing, allow additive formation of objects using more than one modeling material, also referred to as "multi-material" AM processes. For example, U.S. Patent Application having Publication No. 2010/0191360, of the present Assignee, discloses a system which comprises a solid freeform fabrication apparatus having a plurality of print heads, a building material supply apparatus configured to supply a plurality of building materials to the fabrication apparatus, and a control unit configured for controlling the fabrication and supply apparatus. The system has several operation modes. In one mode, all print heads operate during a single building scan cycle of the fabrication apparatus. In another mode, one or more of the print heads is not operative during a single building scan cycle or part thereof.

In a 3D inkjet printing process such as PolyJet™ (Stratasys Ltd., Israel), the building material is selectively jetted from one or more inkjet print heads and/or nozzles and deposited onto a fabrication tray in consecutive layers according to a pre-determined configuration as defined by a software file.

U.S. Pat. No. 9,227,365, by the present assignee, discloses methods and systems for solid freeform fabrication of shelled objects, constructed from a plurality of layers, e.g., a layered core constituting core regions, and a layered shell constituting envelope regions. This is also referred to as digital ABS™, or D-ABS™.

The PolyJet™ technology allows control over the position and composition of each voxel (volume pixel), which affords enormous design versatility and digital programming of multi-material structures. Other advantages of the PolyJet™ technology include the very high printing resolution, e.g. 14 µm layer height, and the ability to print multiple materials simultaneously, in a single object. This multi-material 3D printing process often serves for fabrication of complex parts and structures that are comprised of elements having different stiffness, performance, color or transparency. New ranges of materials, programmed at the voxel level, can be created by the PolyJet™ printing process, using only a few starting materials.

International Patent Application Publication No. WO 2013/128452, by the present Assignee, discloses a multi-material approach which involves separate jetting of two components of a cationic polymerizable system and/or a radical polymerizable system, which intermix on the printing tray, leading to a polymerization reaction similar to pre-mixing of the two components before jetting, while preventing their early polymerization on the inkjet head nozzle plate.

Current PolyJet™ technology offers the capability to use a range of curable (e.g., polymerizable) materials that provide polymeric materials featuring a variety of properties, ranging, for example, from stiff and hard materials (e.g., curable formulations marketed as the Vero™ Family materials) to soft and flexible materials (e.g., curable formulations marketed as the Tango™ and Agilus™ families), and including also objects made using Digital ABS, which contain a multi-material made of two starting materials (e.g., RGD515 & RGD535/531), and simulate properties of engineering plastic. Most of the PolyJet materials currently in use are curable materials which harden or solidify upon exposure to radiation, mostly UV radiation and/or heat, with the most used materials being acrylic-based materials.

Acrylic-based materials typically feature non-optimal thermal stability (resistance to thermal deformation). For example, acrylic-based materials such as multi-functional acrylic materials, which feature, when hardened, Tg above 200° C., exhibit high volume shrinkage which often results in curling and/or other deformation/s of the printed object.

Acrylic-based materials may include, in some cases, additive materials, which are often aimed at imparting to the formed objects or parts thereof desired mechanical or optical properties. Such additives are also referred to herein and in the art as fillers.

WO 2017/208238, by the present assignee, describes a curable elastomeric formulation that comprises an elastomeric curable material and silica particles. Exemplary such formulations are marketed under the trade name Agilus™.

U.S. Patent Application having Publication No. 20170259488, by the present assignee, describes formulations for AM which comprise a filler, preferably in a form of nanoparticles.

U.S. Patent Application having Publication No. 2014/0167300 discloses photo-curable compositions which include photo-curable materials and inorganic nanoparticles as a filler. The disclosed compositions are characterized by a viscosity of 50-500 centipoises at the dispensing temperature.

Additional background art includes WO2009/013751; WO 2016/063282; WO 2016/125170; WO 2017/134672; WO2017/134673; WO 2017/134674; WO 2017/134676; WO 2017/068590; WO2017/187434; WO2018/055521; and WO2018/055522, all to the present assignee.

SUMMARY OF THE INVENTION

According to an aspect of some embodiments of the present invention there is provided a formulation usable in additive manufacturing of a three-dimensional object, the formulation comprising: silica particles, in an amount of from 10 to 30%, or from 15 to 20%, by weight; a first multi-functional curable material in an amount of from 10 to 30%, or from 15 to 20%, by weight, the first multi-functional curable material having a molecular weight of from 300 gram/mol to 1,000 gram/mol; a second multi-functional curable material in an amount of from 10 to 30%, by weight, the second multi-functional curable material having a molecular weight lower than 1,000 gram/mol; and a mono-functional curable material having a molecular weight of no more than 300 gram/mol, in an amount of from 10 to 50% by weight.

According to some of any of the embodiments described herein, the additive manufacturing is 3D inkjet printing.

According to some of any of the embodiments described herein, an average size of the silica nanoparticles is lower than 1 micron, or lower than 500 nm or lower than 100 nm.

According to some of any of the embodiments described herein, an average size of the silica nanoparticles is in a range of from 20 to 100 nm.

According to some of any of the embodiments described herein, at least a portion, or all, of the silica particles comprise functionalized silica particles.

According to some of any of the embodiments described herein, at least a portion, or all, of the silica particles are functionalized by curable functional groups.

According to some of any of the embodiments described herein, the curable functional groups comprise acrylic groups.

According to some of any of the embodiments described herein, the silica particles are pre-dispersed in the first multi-functional curable material.

According to some of any of the embodiments described herein, the first multi-functional curable material is an ethoxylated multi-functional curable material which comprises at least 3 alkylene glycol groups.

According to some of any of the embodiments described herein, the first multi-functional curable material comprises a linear aliphatic branching unit.

According to some of any of the embodiments described herein, the first multi-functional material is a tri-functional curable material.

According to some of any of the embodiments described herein, the first multi-functional material comprises an alicyclic branching unit.

According to some of any of the embodiments described herein, the first multi-functional curable material is a di-functional curable material.

According to some of any of the embodiments described herein, the second multi-functional curable material is an ethoxylated multi-functional curable material which comprises from 2 to 20 alkylene glycol units.

According to some of any of the embodiments described herein, the second multi-functional curable material is an ethoxylated multi-functional curable material which comprises from 2 to 6 alkylene glycol units.

According to some of any of the embodiments described herein, the second multi-functional curable material comprises an aromatic branching unit.

According to some of any of the embodiments described herein, the second multi-functional curable material is a di-functional curable material.

According to some of any of the embodiments described herein, the second multi-functional curable material comprises a methacrylic curable group.

According to some of any of the embodiments described herein, the monofunctional curable material is hydrophilic.

According to some of any of the embodiments described herein, the formulation further comprises an additional monofunctional curable material, in an amount of from 10 to 20% by weight, the additional curable material having a molecular weight of no more than 500 gram/mol.

According to some of any of the embodiments described herein, the additional monofunctional curable material is hydrophobic.

According to some of any of the embodiments described herein, each of the curable materials is a UV-curable material.

According to some of any of the embodiments described herein, each of the curable materials is an acrylic material.

According to some of any of the embodiments described herein, each of the curable materials is an acrylate or a methacrylate.

According to some of any of the embodiments described herein, the formulation comprises: from about 20 to about 60% by weight of a dispersion comprising the silica particles pre-dispersed in the first multi-functional curable material, as described herein in any of the respective embodiments; from about 10 to about 30% by weight of the second multi-functional curable material, as described herein in any of the respective embodiments; from about 20 to about 50% by weight of the monofunctional curable material, as described herein in any of the respective embodiments; and from about 10 to about 30% by weight of the additional curable material, as described herein in any of the respective embodiments.

According to some of any of the embodiments described herein, the first multi-functional curable material is a tri-functional ethoxylated curable material comprising 3 acrylate groups, at least three alkylene glycol groups and an aliphatic branching unit; the second multi-functional curable material is a di-functional ethoxylated curable material comprising two methacrylate groups and an aromatic branching unit; and the monofunctional curable material is a hydrophilic monoacrylate.

According to some of any of the embodiments described herein, the first multi-functional curable material is a di-functional curable material comprising an alicyclic branching unit; the second multi-functional curable material is a di-functional ethoxylated curable material comprising an aromatic branching unit; and the monofunctional curable material is a hydrophilic monoacrylate.

According to some of any of the embodiments described herein, the formulation further comprises a photoinitiator or a photoinitiator system.

According to some of any of the embodiments described herein, the formulation further comprises a surface active agent.

According to some of any of the embodiments described herein, the formulation features a viscosity of from 8 to 30 centipoises at 75° C., when determined on a Brookfield rheometer.

According to some of any of the embodiments described herein, the formulation features, when hardened, at least one of the following characteristics: Tensile strength of at least 70 MPa; and/or Tensile Modulus of at least 3000 MPa; and/or Flexural strength of at least 100 MPa; and/or Flexural modulus of at least 3500 MPa.

According to an aspect of some embodiments of the present invention there is provided a multi-formulation system comprising at least two formulations, at least one of the formulations is a first formulation which is the formulation as described herein in any of the respective embodiments, and at least one another formulation is a second formulation which differs from the first formulation by at least one of HDT, Izod Impact and elastic moduli.

According to an aspect of some embodiments of the present invention there is provided a method of additive manufacturing of a three-dimensional object, the method comprising sequentially forming a plurality of layers in a configured pattern corresponding to the shape of the object, thereby forming the object, wherein the formation of each of at least a few of the layers comprises dispensing at least one formulation, and exposing the dispensed formulation to a curing condition to thereby form a cured modeling material, wherein the at least one formulation is the formulation as described herein in any of the respective embodiments.

According to some of any of the embodiments described herein, the formation of each of at least a few of the layers comprises dispensing at least two formulations, and exposing the dispensed formulations to a curing condition to thereby form a cured material, wherein at least one of the formulations is a first formulation which is the formulation as described herein in any of the respective embodiments and at least one another of the formulations is a second modeling material formulation which differs from the first formulation by at least one of HDT, Izod Impact and elastic moduli.

According to some of any of the embodiments described herein, the formation of each of at least a few of the layers comprises dispensing at least the first and the second formulations to form a core region using the first formulation and at least one envelope region at least partially surrounding the core region using the second formulation.

According to some of any of the embodiments described herein, the formation of each of at least a few of the layers comprises dispensing at least the first and the second formulations to form a core region using the first formulation, at least one inner envelope region at least partially surrounding the core region using both the first and the second formulations, and an outer envelope region at least partially surrounding the inner envelope region using the second formulation.

According to some of any of the embodiments described herein, a weight ratio of the first and second formulations in at least one of the inner envelope region ranges from 3:1 to 1:3.

According to some of any of the embodiments described herein, the dispensing is in a voxelated manner.

According to an aspect of some embodiments of the present invention there is provided an object obtainable by the method as described herein in any of the respective embodiments.

According to an aspect of some embodiments of the present invention there is provided a method for preparing the formulation as described herein in any of the respective embodiments, the method comprising contacting a dispersion of the silica particles and the first multi-functional curable material with the second multi-functional curable material and the monofunctional curable material.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWING(S)

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIGS. 1A-D are schematic illustrations of an additive manufacturing system according to some embodiments of the invention;

Figure 6:
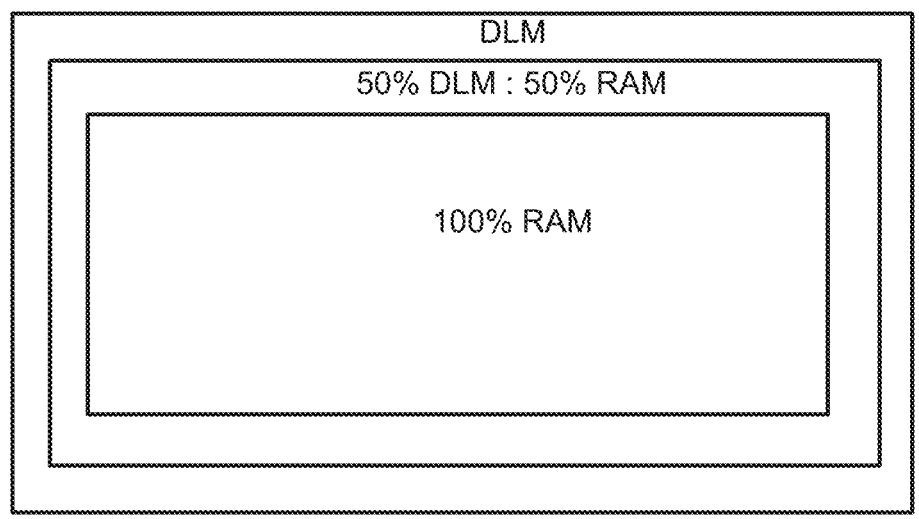
Figure 7:
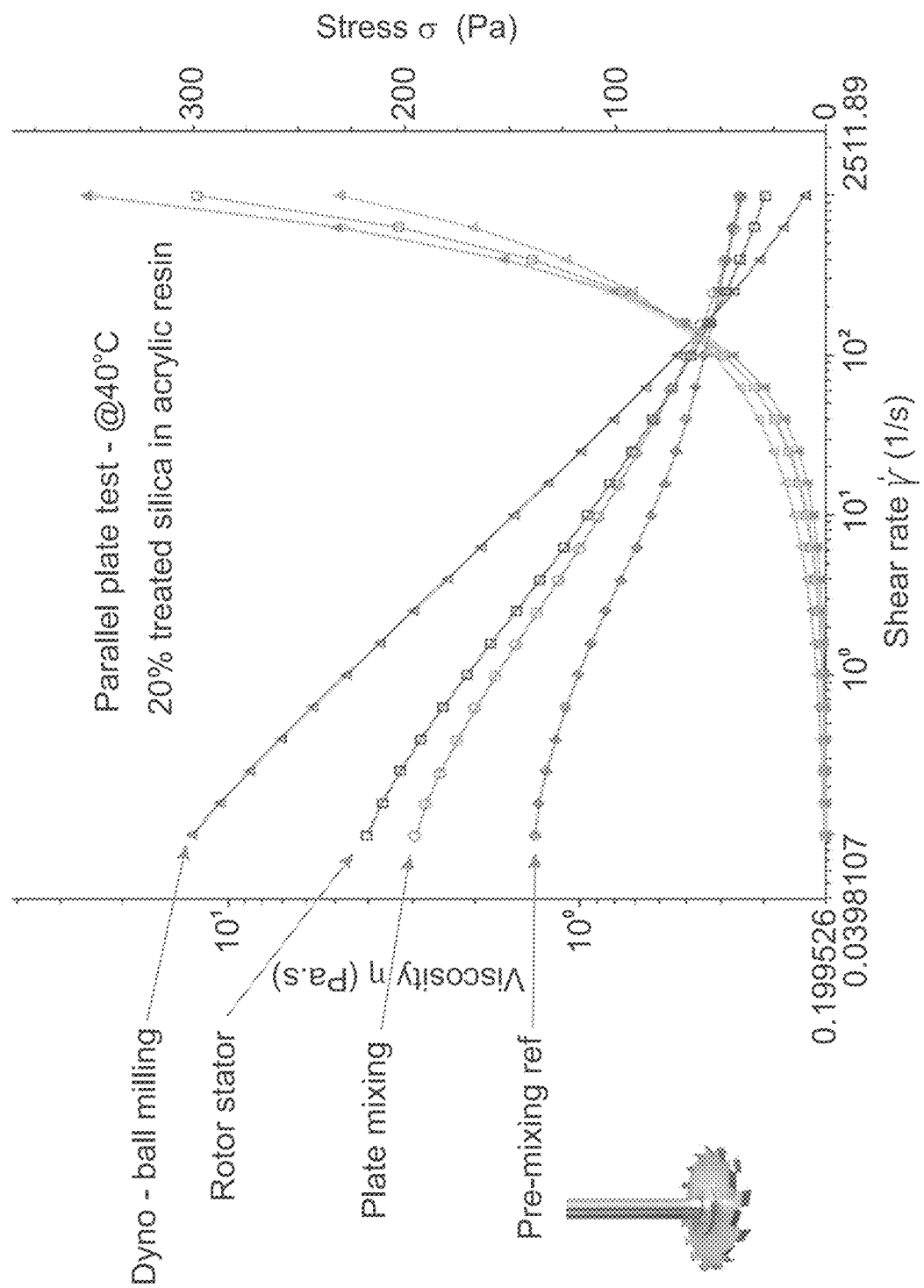
Figure 8:
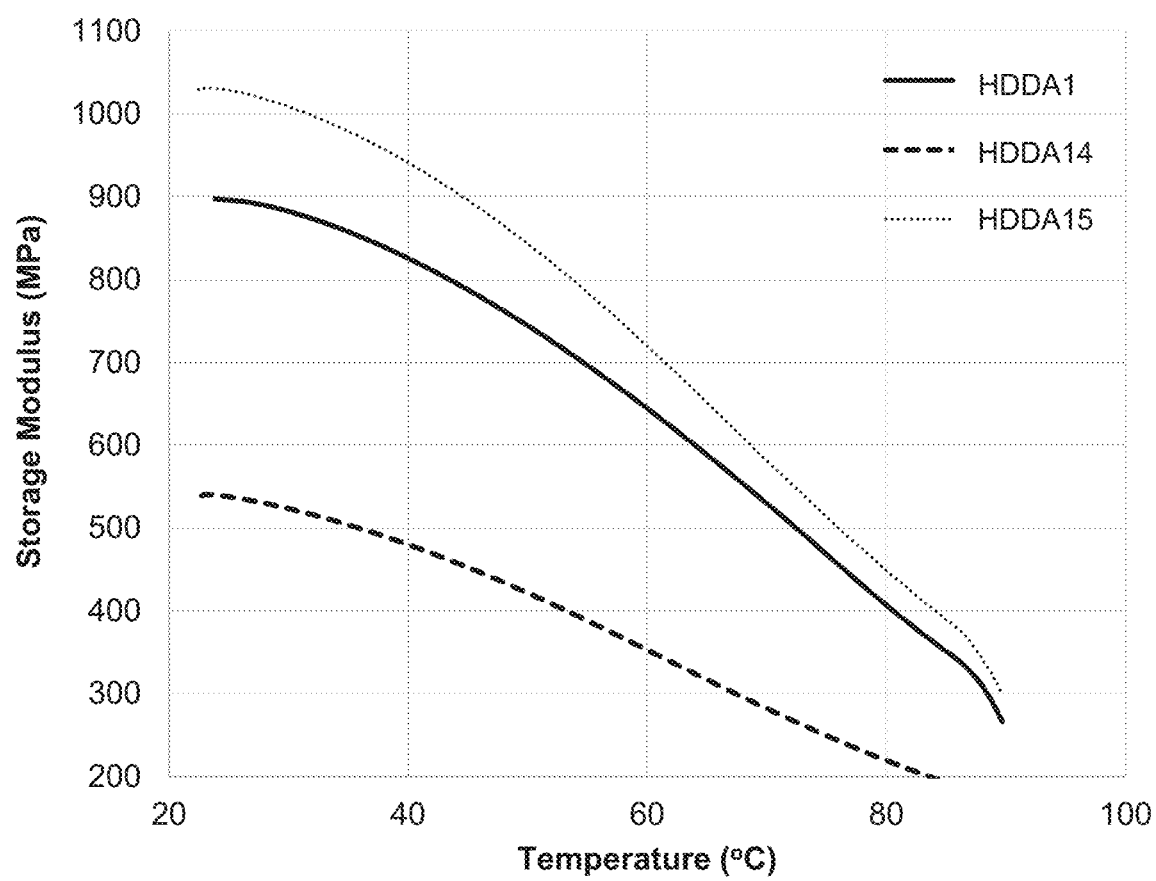
Figure 9:
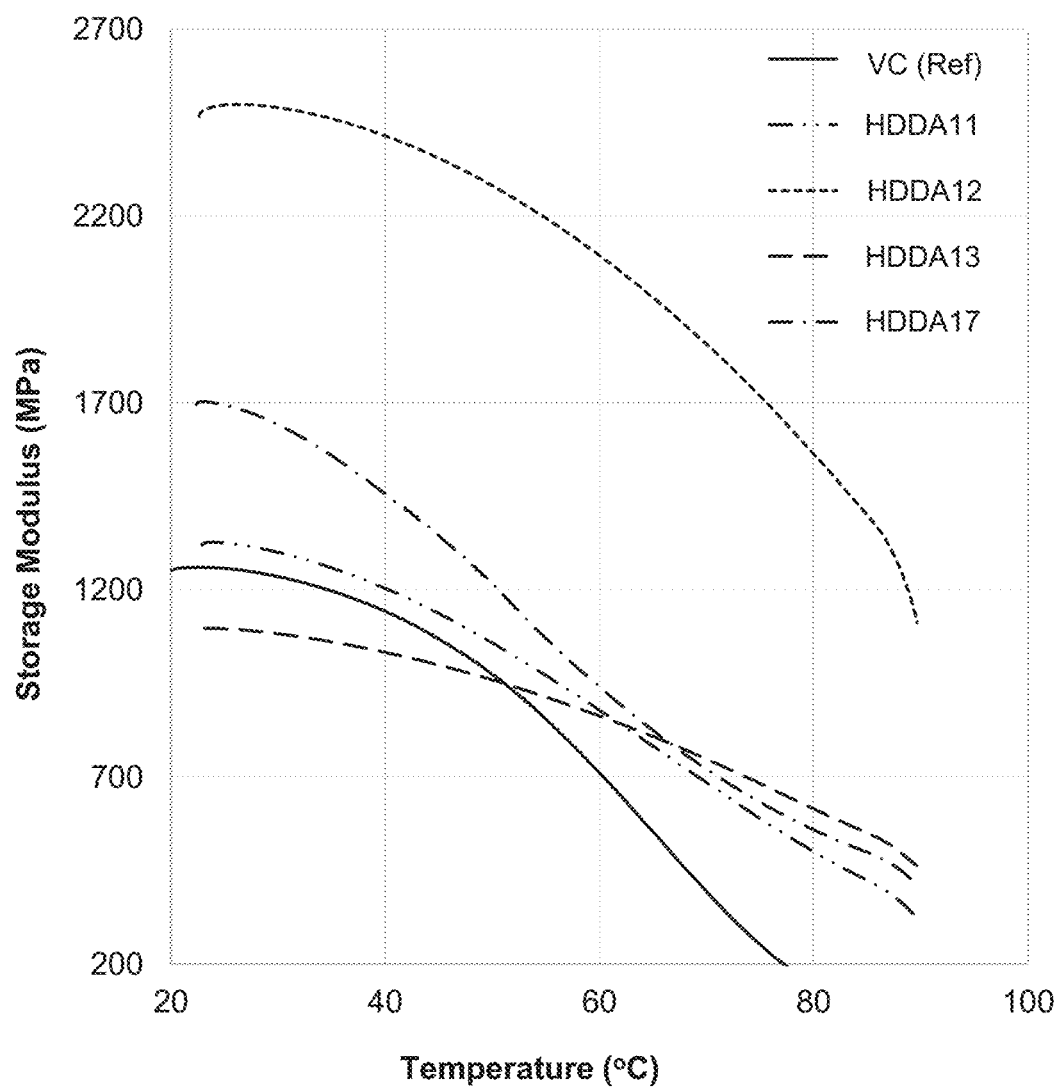
Figure 10:
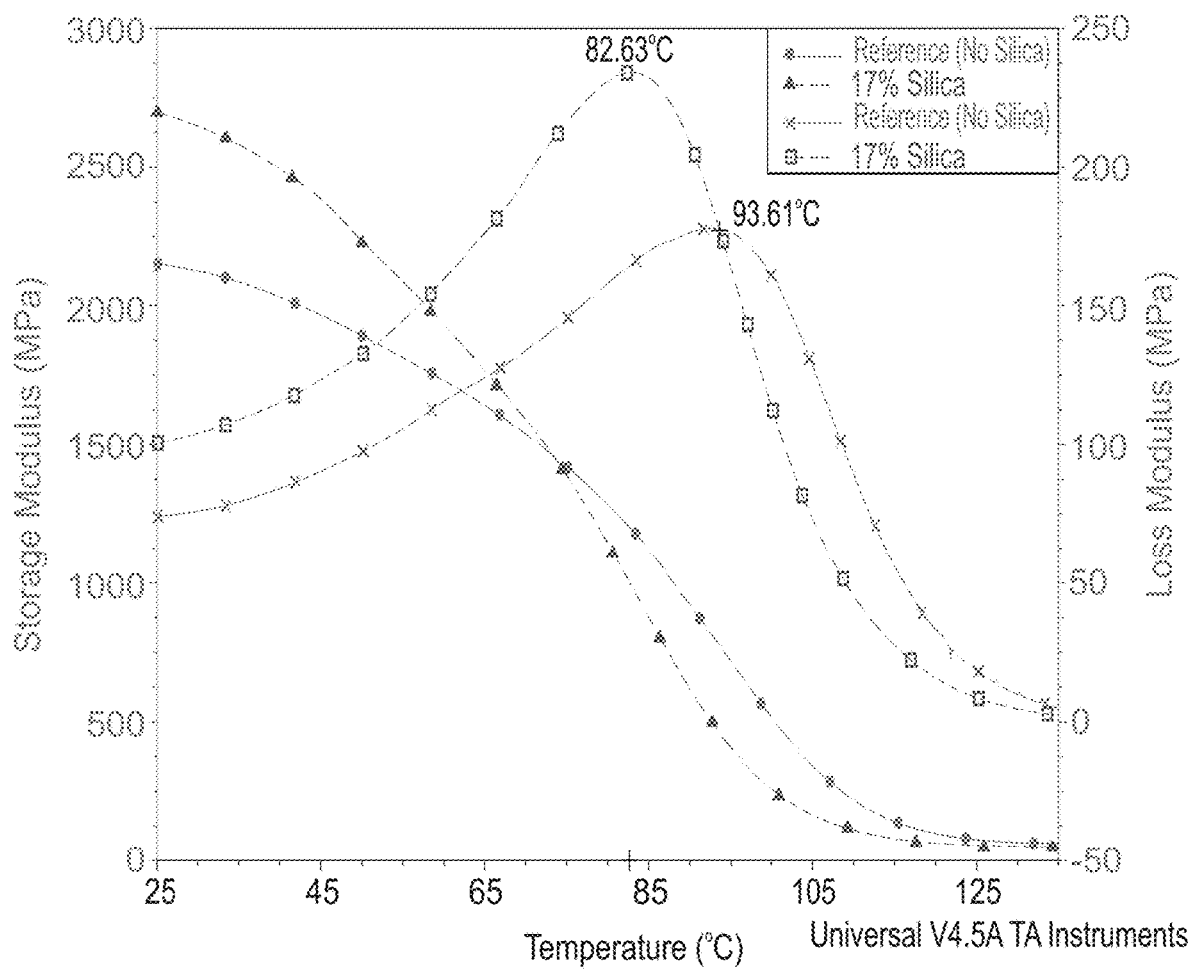
Figure 11:
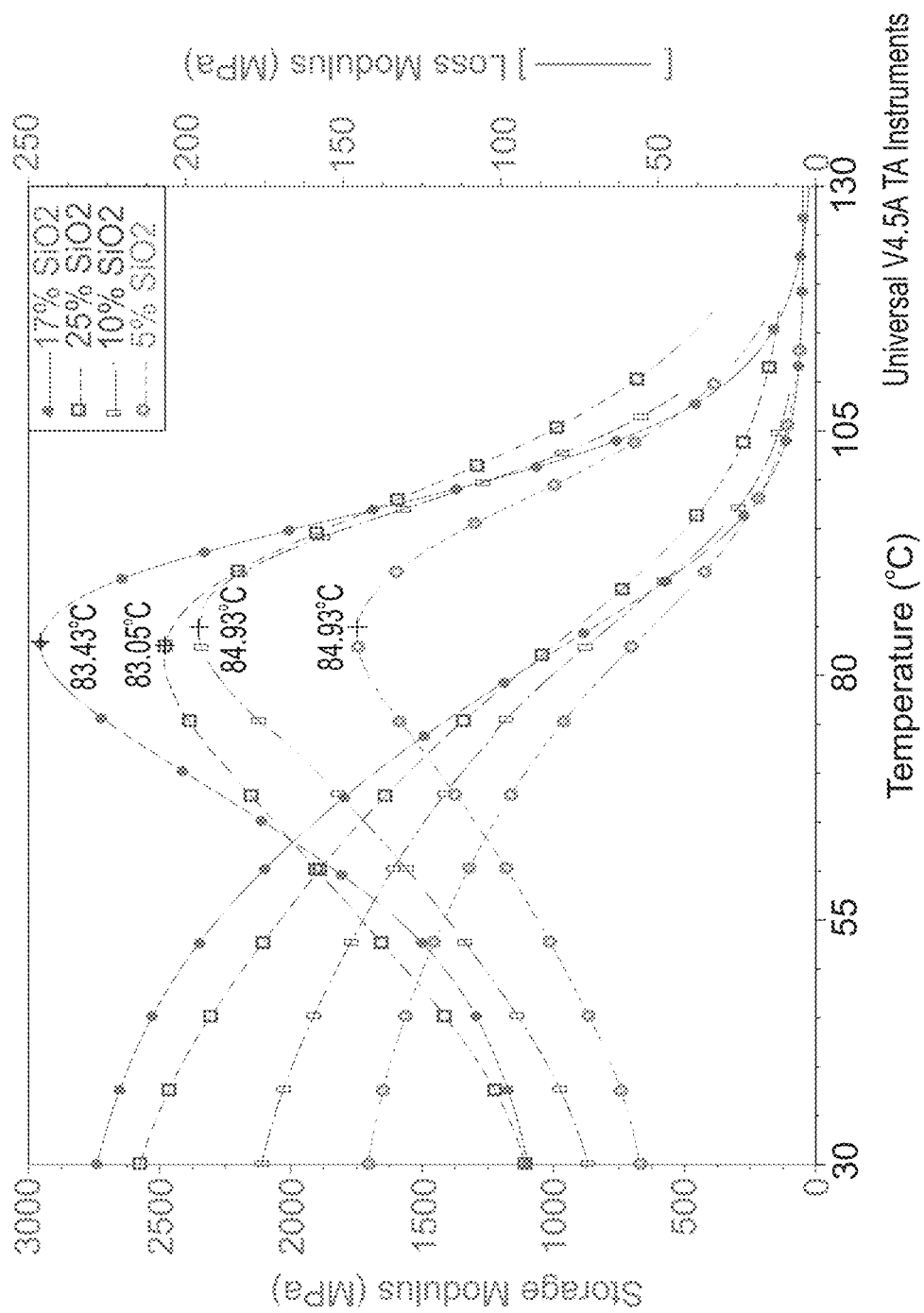
Figure 12:
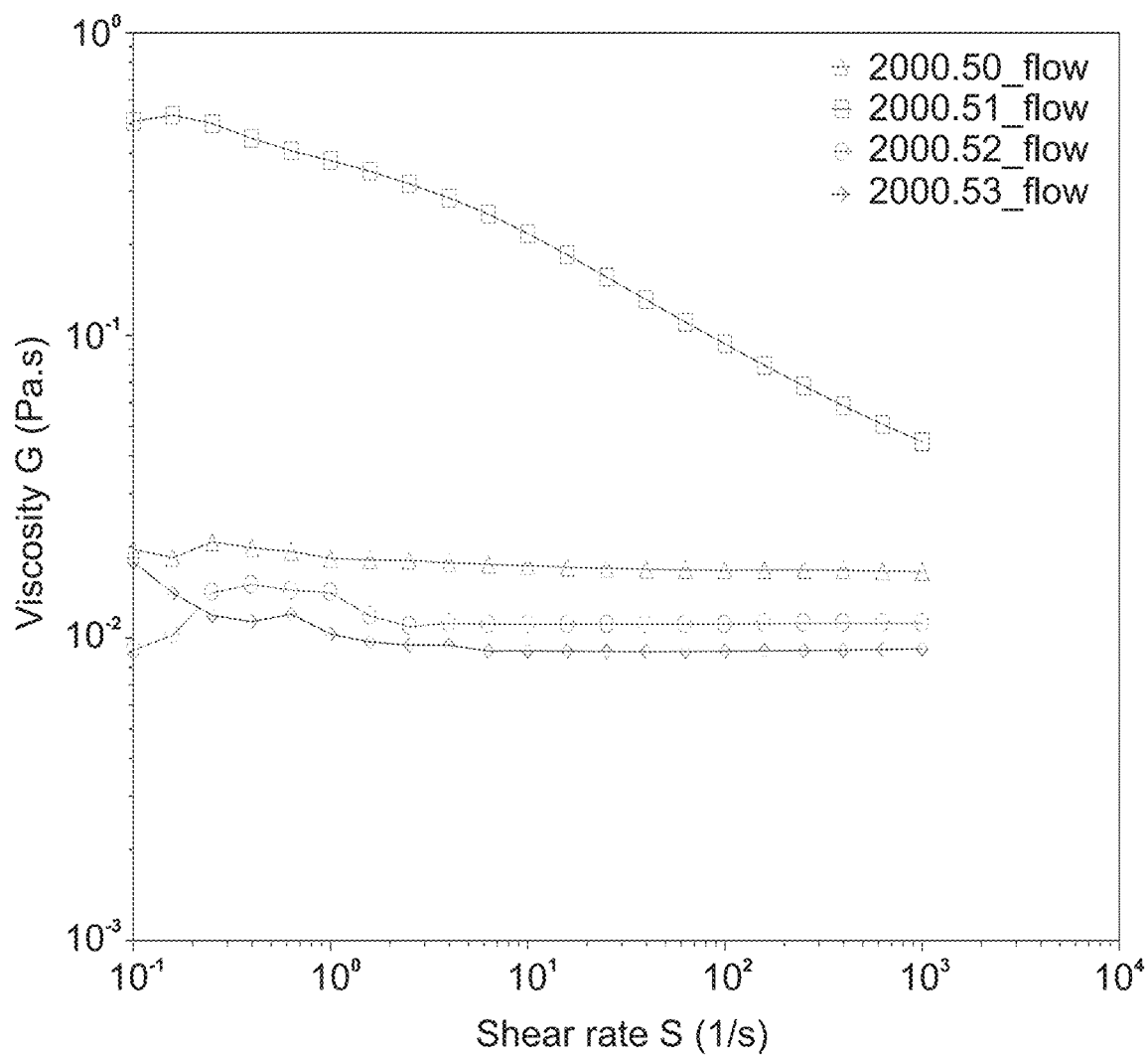
Figure 13:
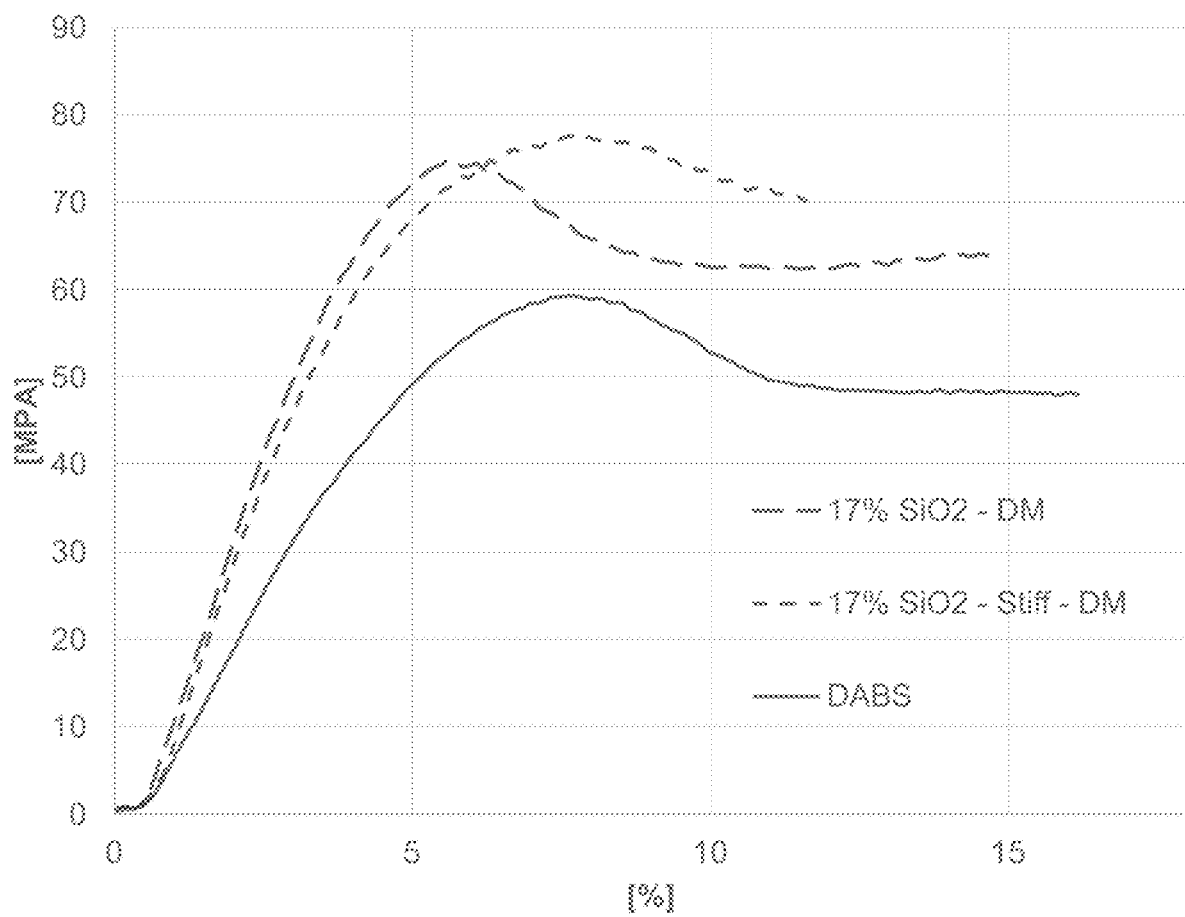
Figure 14:
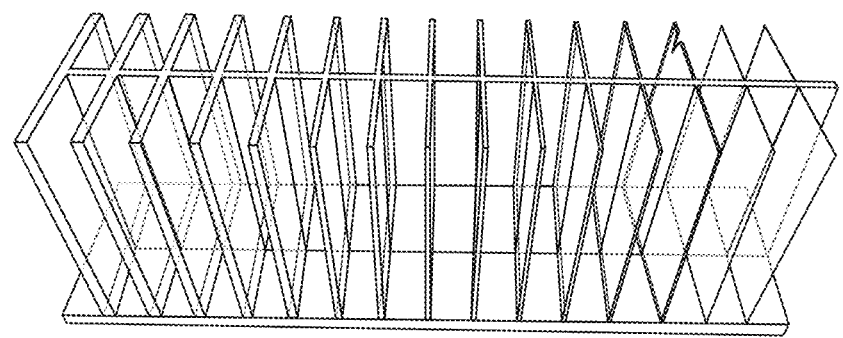

FIGS. 5A-D are schematic illustrations of a representative and non-limiting example of a structure according to some embodiments of the present invention;

FIG. 6 is a schematic illustration of a representative and non-limiting example of a core-shell structure which comprises an intermediate layer, according to some embodiments of the present invention;

FIG. 7 presents comparative plots showing the rheological behavior of formulations comprising a curable acrylate and 20% silica particles, prepared while employing dyno-ball milling (triangles), rotor stator (rectangular), plate mixing (circles) and simple pre-mixing (diamonds);

FIG. 8 presents comparative plots showing the storage modulus of hardened exemplary silica-containing formulations prepared using hexanediol diacrylate (HDDA);

FIG. 9 presents comparative plots showing the storage modulus of additional hardened exemplary silica-containing formulations prepared using HDDA;

FIG. 10 presents comparative plots showing the mechanical properties of a hardened silica-containing formulation prepared using ethoxylated multifunctional acrylate (17% silica), compared to a hardened formulation lacking silica particles (Reference (No Silica));

FIG. 11 presents comparative plots showing the mechanical properties of hardened silica-containing formulations prepared using ethoxylated multifunctional acrylate, at various concentrations of silica nanoparticles;

FIG. 12 presents comparative plots showing the viscosity at 75° C. of hardened silica-containing formulations prepared using ethoxylated multifunctional acrylate, at various concentrations of silica nanoparticles (2000.50=17%; 2000.51=25%; 2000.52=10%; and 2000.53=5%, by weight);

FIG. 13 presents comparative strain-stress plots of objects featuring a core-shell structure as presented in FIG. 6, printed using exemplary silica-containing formulations according to some embodiments of the present invention, compared to core-shell objects printed using formulations lacking silica particles (D-ABS); and FIG. 14 is an illustrative drawing of a 3D object printed with a formulation according to an exemplary embodiment of the present invention, a photograph of which is shown in PCT Patent Application No. PCT/IL2019/051417, the contents of which are hereby incorporated by reference.

DETAILED DESCRIPTION OF SPECIFIC EMBODIMENTS OF THE INVENTION

The present invention, in some embodiments thereof, relates to additive manufacturing (AM), and, more particularly, but not exclusively, to novel formulations usable in AM of three-dimensional objects having in at least a portion thereof a reinforced material.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present inventors have searched for novel formulations that are usable in additive manufacturing and which provide, when hardened, materials that feature improved mechanical properties such as tensile strength and modulus. While such improved properties can be obtained by using reinforcing materials (also referred to herein and in the art as "reinforcers" or "fillers"), typically in a form of particles, the incorporation of reinforcing material particles into the building material is often limited or even disadvantageous since it may adversely affect rheological and mechanical behavior of a formulation and of the hardened material containing such particles.

Fillers that can be used in additive manufacturing are typically obtainable in a form of a powder or in a form of dispersion, where the particles are dispersed in a curable material.

The present inventors have studied the preparation of formulations by incorporating in commercially available curable formulations a silica filler in a form of a powder, and have uncovered that the rheological behavior of the obtained formulations is substantially affected by the technique used for preparing such formulations, as shown in FIG. 7.

The present inventors have studied the use of commercially available dispersions of silica nanoparticles in curable materials. In the laborious studies conducted, the present inventors have identified several requirements that should be met in order to successfully prepare and utilize silica-containing formulations in additive manufacturing in general and in 3D-inkjet printing in particular. The present inventors have designed, based, at least in part, on the identified requirements, and successfully practiced, formulations that exhibit a viscosity that is suitable for a successful 3D-inkjet printing and which exhibit reduced curling while being printed.

Embodiments of the present invention relate to novel filler-containing formulations that are usable in additive manufacturing, to methods of preparing the same, to additive manufacturing three-dimensional objects using such formulations, and to objects obtained thereby.

The method and system of the present embodiments manufacture three-dimensional objects based on computer object data in a layerwise manner by forming a plurality of layers in a configured pattern corresponding to the shape of the objects. The computer object data can be in any known format, including, without limitation, a Standard Tessellation Language (STL) or a StereoLithography Contour (SLC) format, an OBJ File format (OBJ), a 3D Manufacturing Format (3MF), Virtual Reality Modeling Language (VRML), Additive Manufacturing File (AMF) format, Drawing Exchange Format (DXF), Polygon File Format (PLY) or any other format suitable for Computer-Aided Design (CAD).

Each layer is formed by an additive manufacturing apparatus which scans a two-dimensional surface and patterns it. While scanning, the apparatus visits a plurality of target locations on the two-dimensional layer or surface, and decides, for each target location or a group of target locations, whether or not the target location or group of target locations is to be occupied by building material formulation, and which type of building material formulation is to be delivered thereto. The decision is made according to a computer image of the surface.

In preferred embodiments of the present invention the AM comprises three-dimensional printing, more preferably three-dimensional inkjet printing. In these embodiments a building material formulation is dispensed from a dispensing head having one or more arrays of nozzles to deposit building material formulation in layers on a supporting structure. The AM apparatus thus dispenses building material formulation(s) in target locations which are to be occupied and leaves other target locations void. The apparatus typically includes a plurality of dispensing heads and/or arrays of nozzles, each of which can be configured to dispense a different building material formulation. Thus, different target locations can be occupied by different building material formulations. The types of building material formulations can be categorized into two major categories: modeling material formulation and support material formulation. The support material formulation serves as a supporting matrix or construction for supporting the object or object parts during the fabrication process and/or other purposes, e.g., providing hollow or porous objects. Support constructions may additionally include modeling material formulation elements, e.g. for further support strength.

The modeling material formulation is generally a composition which is formulated for use in additive manufacturing and which is able to form a three-dimensional object on its own, i.e., without having to be mixed or combined with any other substance.

The final three-dimensional object is made of the modeling material formulation or a combination of modeling material formulations or modeling and support material formulations or modification thereof (e.g., following curing). All these operations are well-known to those skilled in the art of solid freeform fabrication.

According to some embodiments, the modeling material formulation and optionally also the support material formulation are curable formulations, which harden upon being dispensed, that is, a viscosity of a curable formulation changes by at least one order of magnitude upon being dispensed.

In some exemplary embodiments of the invention an object is manufactured by dispensing two or more different modeling material formulations, each material formulation from a different array of nozzles of the AM apparatus. In some embodiments, two or more such arrays of nozzles that dispense different modeling material formulations are both located in the same printing head of the AM apparatus. In some embodiments, arrays of nozzles that dispense different modeling material formulations are located in separate printing heads, for example, a first array of nozzles dispensing a first modeling material formulation is located in a first printing head, and a second array of nozzles dispensing a second modeling material formulation is located in a second printing head.

In some embodiments, an array of nozzles that dispense a modeling material formulation and an array of nozzles that dispense a support material formulation are both located in the same printing head. In some embodiments, an array of nozzles that dispense a modeling material formulation and an array of nozzles that dispense a support material formulation are both located in separate the same printing head.

The modeling material formulations are optionally and preferably deposited in layers during the same pass of the respective printing head(s). The material formulations and combination of material formulations within the layer are selected according to the desired properties of the object.

Figure 1A:
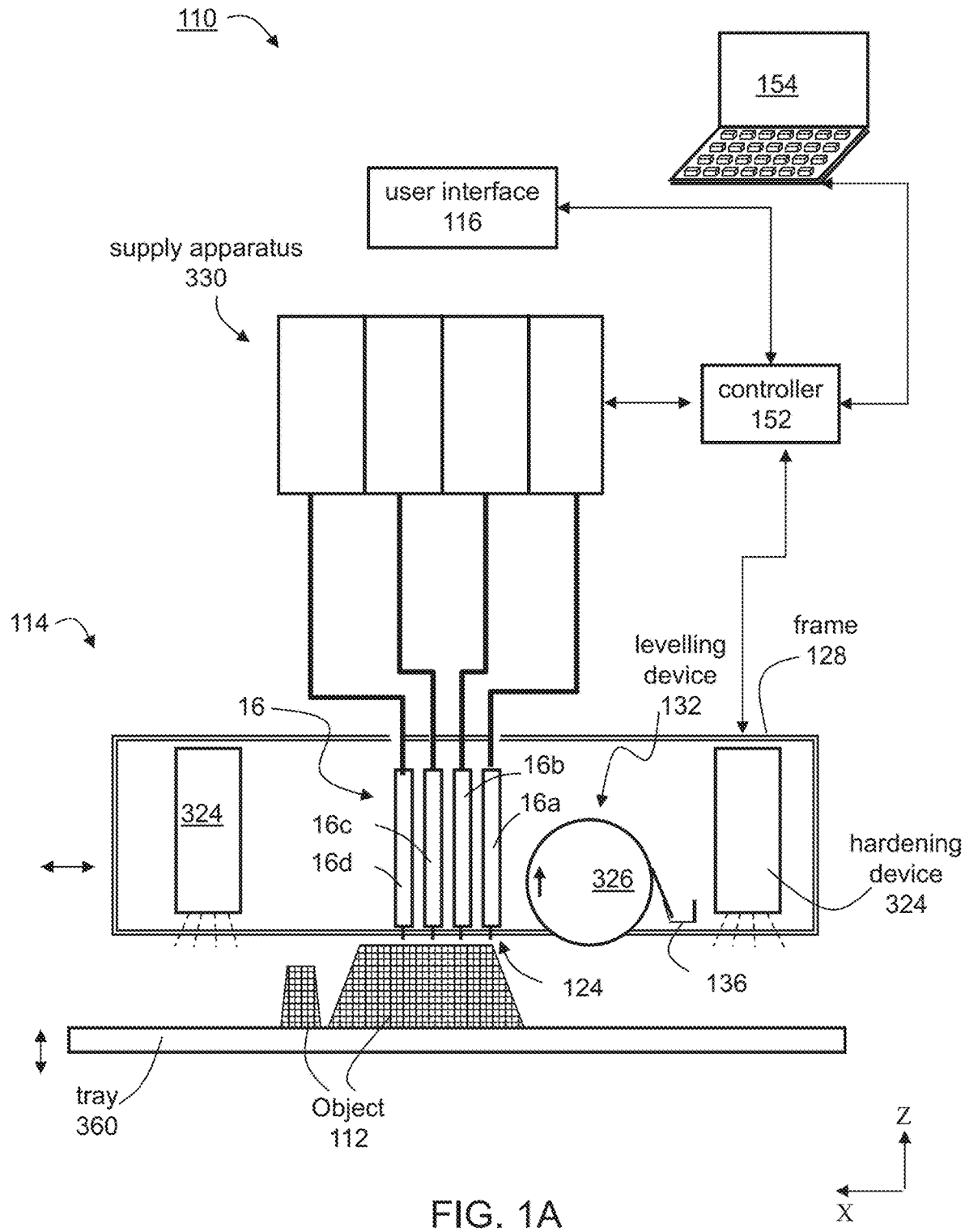
Figure 2A:
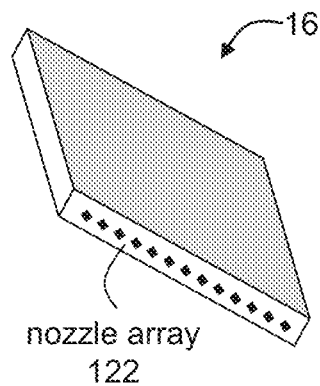
FIGS. 2A-2C are schematic illustrations of printing heads according to some embodiments of the present invention.
Figure 2B:
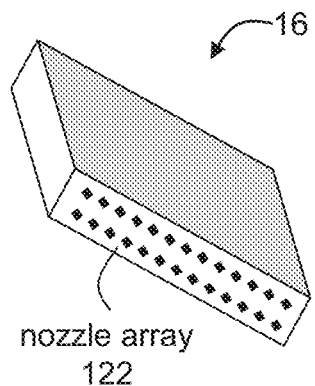
Figure 2C:
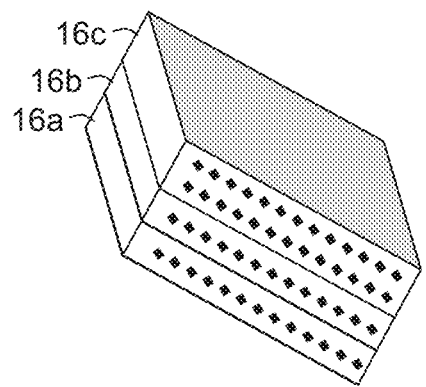

A representative and non-limiting example of a system 110 suitable for AM of an object 112 according to some embodiments of the present invention is illustrated in FIG. 1A. System 110 comprises an additive manufacturing apparatus 114 having a dispensing unit 16 which comprises a plurality of dispensing heads. Each head preferably comprises one or more arrays of nozzles 122, typically mounted on an orifice plate 121, as illustrated in FIGS. 2A-C described below, through which a liquid (uncured) building material formulation 124 is dispensed.

Preferably, but not obligatorily, apparatus 114 is a three-dimensional printing apparatus, in which case the dispensing heads are printing heads, and the building material formulation is dispensed via inkjet technology. This need not necessarily be the case, since, for some applications, it may not be necessary for the additive manufacturing apparatus to employ three-dimensional printing techniques. Representative examples of additive manufacturing apparatus contemplated according to various exemplary embodiments of the present invention include, without limitation, fused deposition modeling apparatus and fused material formulation deposition apparatus.

The term "printing head" as used herein represents a dispensing head usable in 3D printing such as 3D inkjet printing.

The term "dispensing head" encompasses the term "printing head" in the context of embodiments relating to 3D inkjet printing.

Each dispensing head is optionally and preferably fed via one or more building material formulation reservoirs which may optionally include a temperature control unit (e.g., a temperature sensor and/or a heating device), and a material formulation level sensor. To dispense a building material formulation, a voltage signal is applied to the dispensing heads to selectively deposit droplets of a selected formulation or a selected combination of two or more formulations via the dispensing head nozzles, for example, as in piezoelectric inkjet printing technology. Another example includes thermal inkjet printing heads. In these types of heads, there are heater elements in thermal contact with the building material formulation, for heating the building material formulation to form gas bubbles therein, upon activation of the heater elements by a voltage signal. The gas bubbles generate pressures in the building material formulation, causing droplets of building material formulation to be ejected through the nozzles. Piezoelectric and thermal printing heads are known to those skilled in the art of solid freeform fabrication. For any types of inkjet dispensing heads, the dispensing rate of the head depends on the number of nozzles, the type of nozzles and the applied voltage signal rate (frequency).

Preferably, but not obligatorily, the overall number of dispensing nozzles or nozzle arrays is selected such that half of the dispensing nozzles are designated to dispense support material formulation and half of the dispensing nozzles are designated to dispense modeling material formulation, i.e. the number of nozzles jetting modeling material formulations is the same as the number of nozzles jetting support material formulation. In the representative example of FIG. 1A, four dispensing heads 16a, 16b, 16c and 16d are illustrated. Each of heads 16a, 16b, 16c and 16d has a nozzle array. In this Example, heads 16a and 16b can be designated for modeling material formulation/s and heads 16c and 16d can be designated for support material formulation. Thus, head 16a can dispense a first modeling material formulation, head 16b can dispense a second modeling material formulation and heads 16c and 16d can both dispense support material formulation. In an alternative embodiment, heads 16c and 16d, for example, may be combined in a single head having two nozzle arrays for depositing support material formulation. In a further alternative embodiment any one or more of the printing heads may have more than one nozzle arrays for depositing more than one material formulation, e.g. two nozzle arrays for depositing two different modeling material formulations or a modeling material formulation and a support material formulation, each formulation via a different array or number of nozzles.

Yet it is to be understood that it is not intended to limit the scope of the present invention and that the number of modeling material formulation printing heads (modeling heads) and the number of support material formulation printing heads (support heads) may differ. Generally, the number of arrays of nozzles that dispense modeling material formulation, the number of arrays of nozzles that dispense support material formulation, and the number of nozzles in each respective array are selected such as to provide a predetermined ratio, a, between the maximal dispensing rate of the support material formulation and the maximal dispensing rate of modeling material formulation. The value of the predetermined ratio, a, is preferably selected to ensure that in each formed layer, the height of modeling material formulation equals the height of support material formulation. Typical values for a are from about 0.6 to about 1.5.

For example, for a=1, the overall dispensing rate of support material formulation is generally the same as the overall dispensing rate of the modeling material formulation when all arrays of nozzles operate.

For example, apparatus 114 can comprise M modeling heads each having m arrays of p nozzles, and S support heads each having s arrays of q nozzles such that M×m×p=S×s×q. Each of the M×m modeling arrays and S×s support arrays can be manufactured as a separate physical unit, which can be assembled and disassembled from the group of arrays. In this embodiment, each such array optionally and preferably comprises a temperature control unit and a material formulation level sensor of its own, and receives an individually controlled voltage for its operation.

Apparatus 114 can further comprise a solidifying device 324 which can include any device configured to emit light, heat or the like that may cause the deposited material formulation to harden. For example, solidifying device 324 can comprise one or more radiation sources, which can be, for example, an ultraviolet or visible or infrared lamp, or other sources of electromagnetic radiation, or electron beam source, depending on the modeling material formulation being used. In some embodiments of the present invention, solidifying device 324 serves for curing or solidifying the modeling material formulation.

The dispensing head and radiation source are preferably mounted in a frame or block 128 which is preferably operative to reciprocally move over a tray 360, which serves as the working surface. In some embodiments of the present invention the radiation sources are mounted in the block such that they follow in the wake of the dispensing heads to at least partially cure or solidify the material formulations just dispensed by the dispensing heads. Tray 360 is positioned horizontally. According to the common conventions an X—Y—Z Cartesian coordinate system is selected such that the X—Y plane is parallel to tray 360. Tray 360 is preferably configured to move vertically (along the Z direction), typically downward. In various exemplary embodiments of the invention, apparatus 114 further comprises one or more leveling devices 132, e.g. a roller 326. Leveling device 326 serves to straighten, level and/or establish a thickness of the newly formed layer prior to the formation of the successive layer thereon. Leveling device 326 preferably comprises a waste collection device 136 for collecting the excess material formulation generated during leveling. Waste collection device 136 may comprise any mechanism that delivers the material formulation to a waste tank or waste cartridge.

In use, the dispensing heads of unit 16 move in a scanning direction, which is referred to herein as the X direction, and selectively dispense building material formulation in a predetermined configuration in the course of their passage over tray 360. The building material formulation typically comprises one or more types of support material formulation and one or more types of modeling material formulation. The passage of the dispensing heads of unit 16 is followed by the curing of the modeling material formulation(s) by radiation source 126. In the reverse passage of the heads, back to their starting point for the layer just deposited, an additional dispensing of building material formulation may be carried out, according to predetermined configuration. In the forward and/or reverse passages of the dispensing heads, the layer thus formed may be straightened by leveling device 326, which preferably follows the path of the dispensing heads in their forward and/or reverse movement. Once the dispensing heads return to their starting point along the X direction, they may move to another position along an indexing direction, referred to herein as the Y direction, and continue to build the same layer by reciprocal movement along the X direction. Alternately, the dispensing heads may move in the Y direction between forward and reverse movements or after more than one forward-reverse movement. The series of scans performed by the dispensing heads to complete a single layer is referred to herein as a single scan cycle.

Once the layer is completed, tray 360 is lowered in the Z direction to a predetermined Z level, according to the desired thickness of the layer subsequently to be printed. The procedure is repeated to form three-dimensional object 112 in a layerwise manner.

In another embodiment, tray 360 may be displaced in the Z direction between forward and reverse passages of the dispensing head of unit 16, within the layer. Such Z displacement is carried out in order to cause contact of the leveling device with the surface in one direction and prevent contact in the other direction.

System 110 optionally and preferably comprises a building material formulation supply system 330 which comprises the building material formulation containers or cartridges and supplies a plurality of building material formulations to fabrication apparatus 114.

A control unit 152 controls fabrication apparatus 114 and optionally and preferably also supply system 330. Control unit 152 typically includes an electronic circuit configured to perform the controlling operations. Control unit 152 preferably communicates with a data processor 154 which transmits digital data pertaining to fabrication instructions based on computer object data, e.g., a CAD configuration represented on a computer readable medium in a form of a Standard Tessellation Language (STL) format or the like. Typically, control unit 152 controls the voltage applied to each dispensing head or each nozzle array and the temperature of the building material formulation in the respective printing head or respective nozzle array.

Once the manufacturing data is loaded to control unit 152 it can operate without user intervention. In some embodiments, control unit 152 receives additional input from the operator, e.g., using data processor 154 or using a user interface 116 communicating with unit 152. User interface 116 can be of any type known in the art, such as, but not limited to, a keyboard, a touch screen and the like. For example, control unit 152 can receive, as additional input, one or more building material formulation types and/or attributes, such as, but not limited to, color, characteristic distortion and/or transition temperature, viscosity, electrical property, magnetic property. Other attributes and groups of attributes are also contemplated.

Figure 1D:
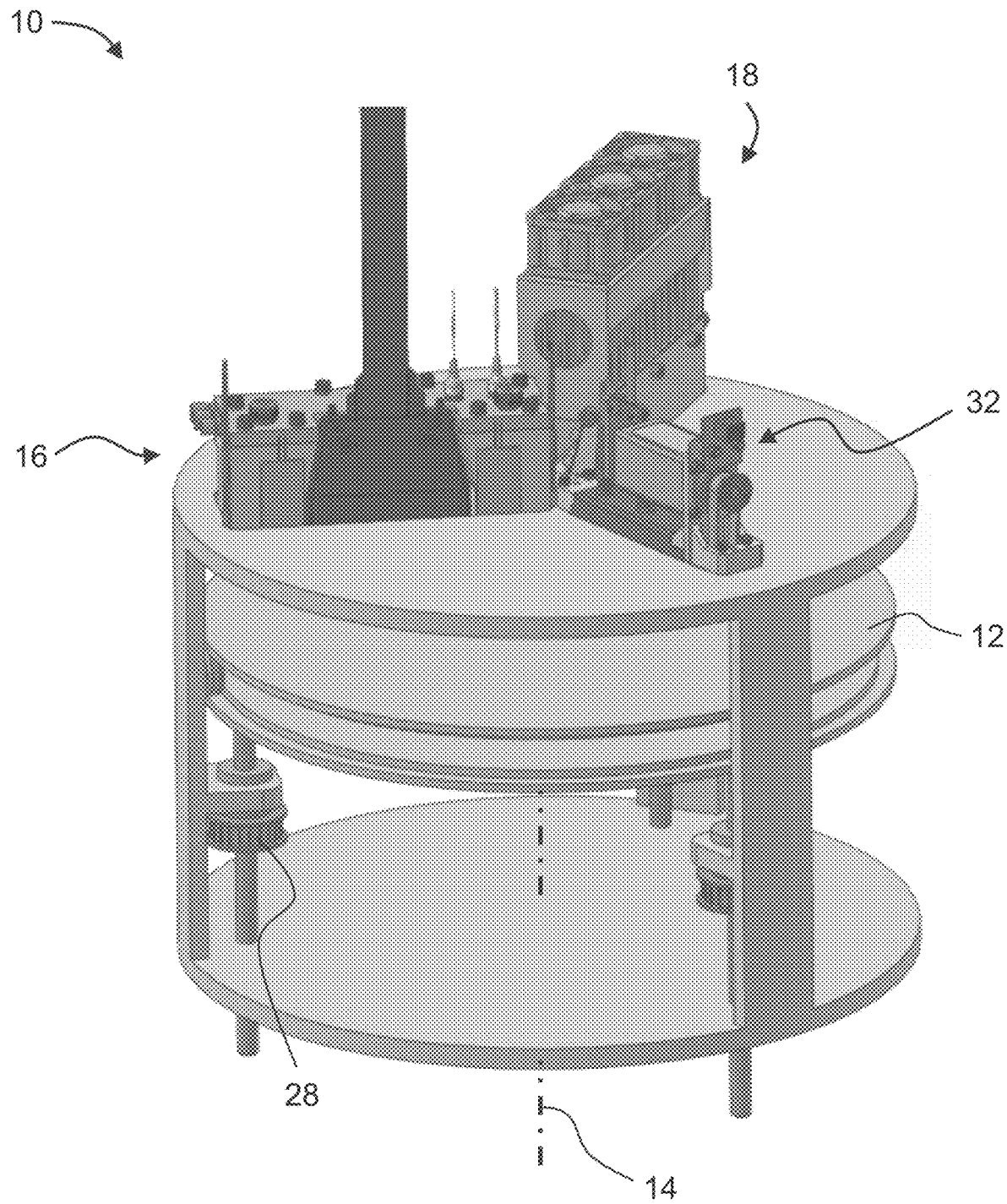

Another representative and non-limiting example of a system 10 suitable for AM of an object according to some embodiments of the present invention is illustrated in FIGS. 1B-D. FIGS. 1B-D illustrate a top view (FIG. 1B), a side view (FIG. 1C) and an isometric view (FIG. 1D) of system 10.

In the present embodiments, system 10 comprises a tray 12 and a plurality of inkjet printing heads 16, each having each having one or more arrays of nozzles with respective one or more pluralities separated nozzles. Tray 12 can have a shape of a disk or it can be annular. Non-round shapes are also contemplated, provided they can be rotated about a vertical axis.

Tray 12 and heads 16 are optionally and preferably mounted such as to allow a relative rotary motion between tray 12 and heads 16. This can be achieved by (i) configuring tray 12 to rotate about a vertical axis 14 relative to heads 16, (ii) configuring heads 16 to rotate about vertical axis 14 relative to tray 12, or (iii) configuring both tray 12 and heads 16 to rotate about vertical axis 14 but at different rotation velocities (e.g., rotation at opposite direction). While the embodiments below are described with a particular emphasis to configuration (i) wherein the tray is a rotary tray that is configured to rotate about vertical axis 14 relative to heads 16, it is to be understood that the present application contemplates also configurations (ii) and (iii). Any one of the embodiments described herein can be adjusted to be applicable to any of configurations (ii) and (iii), and one of ordinary skills in the art, provided with the details described herein, would know how to make such adjustment.

In the following description, a direction parallel to tray 12 and pointing outwardly from axis 14 is referred to as the radial direction r, a direction parallel to tray 12 and perpendicular to the radial direction r is referred to herein as the azimuthal direction φ, and a direction perpendicular to tray 12 is referred to herein is the vertical direction z.

The term "radial position," as used herein, refers to a position on or above tray 12 at a specific distance from axis 14. When the term is used in connection to a printing head, the term refers to a position of the head which is at specific distance from axis 14. When the term is used in connection to a point on tray 12, the term corresponds to any point that belongs to a locus of points that is a circle whose radius is the specific distance from axis 14 and whose center is at axis 14.

The term "azimuthal position," as used herein, refers to a position on or above tray 12 at a specific azimuthal angle relative to a predetermined reference point. Thus, radial position refers to any point that belongs to a locus of points that is a straight line forming the specific azimuthal angle relative to the reference point.

The term "vertical position," as used herein, refers to a position over a plane that intersect the vertical axis 14 at a specific point.

Tray 12 serves as a supporting structure for three-dimensional printing. The working area on which one or objects are printed is typically, but not necessarily, smaller than the total area of tray 12. In some embodiments of the present invention the working area is annular. The working area is shown at 26. In some embodiments of the present invention tray 12 rotates continuously in the same direction throughout the formation of object, and in some embodiments of the present invention tray reverses the direction of rotation at least once (e.g., in an oscillatory manner) during the formation of the object. Tray 12 is optionally and preferably removable. Removing tray 12 can be for maintenance of system 10, or, if desired, for replacing the tray before printing a new object. In some embodiments of the present invention system 10 is provided with one or more different replacement trays (e.g., a kit of replacement trays), wherein two or more trays are designated for different types of objects (e.g., different weights) different operation modes (e.g., different rotation speeds), etc. The replacement of tray 12 can be manual or automatic, as desired. When automatic replacement is employed, system 10 comprises a tray replacement device 36 configured for removing tray 12 from its position below heads 16 and replacing it by a replacement tray (not shown). In the representative illustration of FIG. 1B tray replacement device 36 is illustrated as a drive 38 with a movable arm 40 configured to pull tray 12, but other types of tray replacement devices are also contemplated.

Exemplified embodiments for the printing head 16 are illustrated in FIGS. 2A-2C. These embodiments can be employed for any of the AM systems described above, including, without limitation, system 110 and system 10.

FIGS. 2A-B illustrate a printing head 16 with one (FIG. 2A) and two (FIG. 2B) nozzle arrays 22. The nozzles in the array are preferably aligned linearly, along a straight line. In embodiments in which a particular printing head has two or more linear nozzle arrays, the nozzle arrays are optionally and preferably can be parallel to each other. When a printing head has two or more arrays of nozzles (e.g., FIG. 2B) all arrays of the head can be fed with the same building material formulation, or at least two arrays of the same head can be fed with different building material formulations.

When a system similar to system 110 is employed, all printing heads 16 are optionally and preferably oriented along the indexing direction with their positions along the scanning direction being offset to one another.

When a system similar to system 10 is employed, all printing heads 16 are optionally and preferably oriented radially (parallel to the radial direction) with their azimuthal positions being offset to one another. Thus, in these embodiments, the nozzle arrays of different printing heads are not parallel to each other but are rather at an angle to each other, which angle being approximately equal to the azimuthal offset between the respective heads. For example, one head can be oriented radially and positioned at azimuthal position $\varphi_1$, and another head can be oriented radially and positioned at azimuthal position $\varphi_2$. In this example, the azimuthal offset between the two heads is $\varphi_1$-$\varphi_2$, and the angle between the linear nozzle arrays of the two heads is also $\varphi_2$-$\varphi_2$.

In some embodiments, two or more printing heads can be assembled to a block of printing heads, in which case the printing heads of the block are typically parallel to each other. A block including several inkjet printing heads 16a, 16b, 16c is illustrated in FIG. 2C.

In some embodiments, system 10 comprises a support structure 30 positioned below heads 16 such that tray 12 is between support structure 30 and heads 16. Support structure 30 may serve for preventing or reducing vibrations of tray 12 that may occur while inkjet printing heads 16 operate. In configurations in which printing heads 16 rotate about axis 14, support structure 30 preferably also rotates such that support structure 30 is always directly below heads 16 (with tray 12 between heads 16 and tray 12).

Tray 12 and/or printing heads 16 is optionally and preferably configured to move along the vertical direction z, parallel to vertical axis 14 so as to vary the vertical distance between tray 12 and printing heads 16. In configurations in which the vertical distance is varied by moving tray 12 along the vertical direction, support structure 30 preferably also moves vertically together with tray 12. In configurations in which the vertical distance is varied by heads 16 along the vertical direction, while maintaining the vertical position of tray 12 fixed, support structure 30 is also maintained at a fixed vertical position.

The vertical motion can be established by a vertical drive 28. Once a layer is completed, the vertical distance between tray 12 and heads 16 can be increased (e.g., tray 12 is lowered relative to heads 16) by a predetermined vertical step, according to the desired thickness of the layer subsequently to be printed. The procedure is repeated to form a three-dimensional object in a layerwise manner.

The operation of inkjet printing heads 16 and optionally and preferably also of one or more other components of system 10, e.g., the motion of tray 12, are controlled by a controller 20. The controller can have an electronic circuit and a non-volatile memory medium readable by the circuit, wherein the memory medium stores program instructions which, when read by the circuit, cause the circuit to perform control operations as further detailed below.

Controller 20 can also communicate with a host computer 24 which transmits digital data pertaining to fabrication instructions based on computer object data, e.g., in a form of a Standard Tessellation Language (STL) or a StereoLithography Contour (SLC) format, Virtual Reality Modeling Language (VRML), Additive Manufacturing File (AMF) format, Drawing Exchange Format (DXF), Polygon File Format (PLY) or any other format suitable for Computer-Aided Design (CAD). The object data formats are typically structured according to a Cartesian system of coordinates. In these cases, computer 24 preferably executes a procedure for transforming the coordinates of each slice in the computer object data from a Cartesian system of coordinates into a polar system of coordinates. Computer 24 optionally and preferably transmits the fabrication instructions in terms of the transformed system of coordinates. Alternatively, computer 24 can transmit the fabrication instructions in terms of the original system of coordinates as provided by the computer object data, in which case the transformation of coordinates is executed by the circuit of controller 20.

Figure 3A:
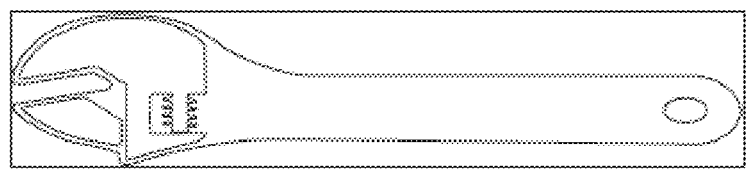
FIGS. 3A-3B are schematic illustrations demonstrating coordinate transformations according to some embodiments of the present invention.
Figure 3B:
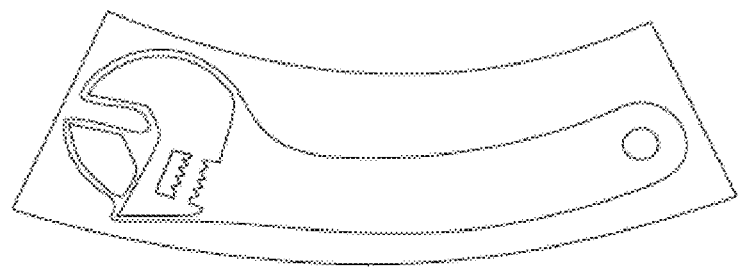

The transformation of coordinates allows three-dimensional printing over a rotating tray. In non-rotary systems with a stationary tray with the printing heads typically reciprocally move above the stationary tray along straight lines. In such systems, the printing resolution is the same at any point over the tray, provided the dispensing rates of the heads are uniform. In system 10, unlike non-rotary systems, not all the nozzles of the head points cover the same distance over tray 12 during at the same time. The transformation of coordinates is optionally and preferably executed so as to ensure equal amounts of excess material formulation at different radial positions. Representative examples of coordinate transformations according to some embodiments of the present invention are provided in FIGS. 3A-B, showing three slices of an object (each slice corresponds to fabrication instructions of a different layer of the objects), where FIG. 3A illustrates a slice in a Cartesian system of coordinates and FIG. 3B illustrates the same slice following an application of a transformation of coordinates procedure to the respective slice.

Typically, controller 20 controls the voltage applied to the respective component of the system 10 based on the fabrication instructions and based on the stored program instructions as described below.

Generally, controller 20 controls printing heads 16 to dispense, during the rotation of tray 12, droplets of building material formulation in layers, such as to print a three-dimensional object on tray 12.

System 10 optionally and preferably comprises one or more radiation sources 18, which can be, for example, an ultraviolet or visible or infrared lamp, or other sources of electromagnetic radiation, or electron beam source, depending on the modeling material formulation being used. Radiation source can include any type of radiation emitting device, including, without limitation, light emitting diode (LED), digital light processing (DLP) system, resistive lamp and the like. Radiation source 18 serves for curing or solidifying the modeling material formulation. In various exemplary embodiments of the invention the operation of radiation source 18 is controlled by controller 20 which may activate and deactivate radiation source 18 and may optionally also control the amount of radiation generated by radiation source 18.

In some embodiments of the invention, system 10 further comprises one or more leveling devices 32 which can be manufactured as a roller or a blade. Leveling device 32 serves to straighten the newly formed layer prior to the formation of the successive layer thereon. In some embodiments, leveling device 32 has the shape of a conical roller positioned such that its symmetry axis 34 is tilted relative to the surface of tray 12 and its surface is parallel to the surface of the tray. This embodiment is illustrated in the side view of system 10 (FIG. 1C).

The conical roller can have the shape of a cone or a conical frustum.

The opening angle of the conical roller is preferably selected such that is a constant ratio between the radius of the cone at any location along its axis 34 and the distance between that location and axis 14. This embodiment allows roller 32 to efficiently level the layers, since while the roller rotates, any point p on the surface of the roller has a linear velocity which is proportional (e.g., the same) to the linear velocity of the tray at a point vertically beneath point p. In some embodiments, the roller has a shape of a conical frustum having a height h, a radius $R_1$ at its closest distance from axis 14, and a radius $R_2$ at its farthest distance from axis 14, wherein the parameters h, $R_1$ and $R_2$ satisfy the relation $R_1/R_2=(R-h)/h$ and wherein R is the farthest distance of the roller from axis 14 (for example, R can be the radius of tray 12).

The operation of leveling device 32 is optionally and preferably controlled by controller 20 which may activate and deactivate leveling device 32 and may optionally also control its position along a vertical direction (parallel to axis 14) and/or a radial direction (parallel to tray 12 and pointing toward or away from axis 14.

In some embodiments of the present invention printing heads 16 are configured to reciprocally move relative to tray along the radial direction r. These embodiments are useful when the lengths of the nozzle arrays 22 of heads 16 are shorter than the width along the radial direction of the working area 26 on tray 12. The motion of heads 16 along the radial direction is optionally and preferably controlled by controller 20.

Some embodiments contemplate the fabrication of an object by dispensing different material formulations from different arrays of nozzles (belonging to the same or different printing head). These embodiments provide, inter alia, the ability to select material formulations from a given number of material formulations and define desired combinations of the selected material formulations and their properties. According to the present embodiments, the spatial locations of the deposition of each material formulation with the layer is defined, either to effect occupation of different three-dimensional spatial locations by different material formulations, or to effect occupation of substantially the same three-dimensional location or adjacent three-dimensional locations by two or more different material formulations so as to allow post deposition spatial combination of the material formulations within the layer, thereby to form a composite material formulation at the respective location or locations.

Any post deposition combination or mix of modeling material formulations is contemplated. For example, once a certain material formulation is dispensed it may preserve its original properties. However, when it is dispensed simultaneously with another modeling material formulation or other dispensed material formulations which are dispensed at the same or nearby locations, a composite material formulation having a different property or properties to the dispensed material formulations is formed.

The present embodiments thus enable the deposition of a broad range of material formulation combinations, and the fabrication of an object which may consist of multiple different combinations of material formulations, in different parts of the object, according to the properties desired to characterize each part of the object.

Further details on the principles and operations of an AM system suitable for the present embodiments are found in U.S. Published Application No. 20100191360, the contents of which are hereby incorporated by reference.

Herein throughout, the term "object" describes a final product of the additive manufacturing. This term refers to the product obtained by a method as described herein, after removal of the support material, if such has been used as part of the building material, and/or after post-treatment, if such has been used as part of the method. The "object" therefore essentially consists (at least 95 weight percents) of a hardened (e.g., cured) modeling material.

The term "object" as used herein throughout refers to a whole object or a part thereof.

An object according to the present embodiments is such that at least a part or a portion thereof is a reinforced material, which comprises a reinforcing material (filler) as described herein and a hardened modeling material. The object may be such that several parts or portions thereof are made of a reinforced material, or such that is entirely made of a reinforced material. The reinforced material can be the same or different in the different parts or portions, and, for each part, portion or the entire object made of a reinforced material, the reinforced material can be the same or different within the portion, part or object. When different reinforced materials are used, they can differ in their chemical composition and/or mechanical properties, as is further explained hereinafter.

Herein throughout, the phrases "building material formulation", "uncured building material", "uncured building material formulation", "building material" and other variations therefore, collectively describe the materials that are dispensed to sequentially form the layers, as described herein. This phrase encompasses uncured materials dispensed so as to form the object, namely, one or more uncured modeling material formulation(s), and uncured materials dispensed so as to form the support, namely uncured support material formulations.

Herein throughout, the phrase "cured modeling material" or "hardened modeling material" describes the part of the building material that forms the object, as defined herein, upon exposing the dispensed building material to curing, and, optionally, if a support material has been dispensed, also upon removal of the cured support material, as described herein. The hardened modeling material can be a single material or a mixture of two or more materials, depending on the modeling material formulations used, as described herein.

The phrase "cured modeling material" or "hardened modeling material" or "cured modeling material formulation" or "hardened modeling material formulation" can be regarded as a cured building material wherein the building material consists only of a modeling material formulation (and not of a support material formulation). That is, this phrase refers to the portion of the building material, which is used to provide the final object.

Herein throughout, the phrase "modeling material formulation", which is also referred to herein interchangeably as "modeling formulation", "model formulation" "model material formulation" or simply as "formulation", describes a part or all of the building material which is dispensed so as to form the object, as described herein. The modeling material formulation is an uncured modeling formulation (unless specifically indicated otherwise), which, upon exposure to a curing condition (e.g., curing energy), forms the object or a part thereof.

In some embodiments of the present invention, a modeling material formulation is formulated for use in three-dimensional inkjet printing and is able to form a three-dimensional object on its own, i.e., without having to be mixed or combined with any other substance.

An uncured building material can comprise one or more modeling formulations, and can be dispensed such that different parts of the object are made, upon curing, of different hardened modeling formulations or different combinations thereof, and hence are made of different hardened modeling materials or different mixtures of hardened modeling materials.

The formulations forming the building material (modeling material formulations and support material formulations) are curable formulations, or formulations that comprise a curable system, and comprise one or more curable materials, which, when exposed to a curing condition (e.g., curing energy), form hardened (cured) material. Typically, a curable system or formulation further comprises one or more agents for promoting hardening of the formulation, for example, one or more agents for promoting polymerization of polymerizable materials.

A curable formulation or formulation system according to the present embodiments is such that hardens, typically upon exposure to a suitable condition (e.g., irradiation or heat), within less than 1 minute, preferably less than 30 seconds, more preferably less than 20 seconds, for example, within a time period that ranges from few milliseconds to 30 seconds, including any intermediate values and subranges therebetween. Such a hardening or curing time is desirable in a layerwise fabrication of objects as described herein in any of the respective embodiments.

A curable formulation or formulation system usable in additive manufacturing such as three-dimensional inkjet printing is such that a thin layer of the formulation (e.g., of less than 50 microns, for example, of 5-40 microns) hardens to a hardening degree of at least 80% when exposed to irradiation, within less than 1 second (e.g., within 100 milliseconds to 1 second).

By "hardening degree" or "degree of hardening" it is meant herein the extent at which hardening is effected, that is, the extent at which curable materials or curable formulation systems as described herein harden, for example, undergo polymerization and/or cross-linking. When a curable material is a polymerizable material, this phrase encompasses both a mol % of the curable materials in a formulation that underwent polymerization and/or cross-linking, upon exposure to a curing condition; and/or the degree at which polymerization and/or cross-linking was effected, for example, the degree of chain elongation and/or cross-linking. Determining a degree of polymerization can be performed by methods known to those skilled in the art.

Herein throughout, a "curable material" is a compound (typically a monomeric or oligomeric compound, yet optionally a polymeric material) which, when exposed to a curing condition, as described herein, solidifies or hardens to form a hardened (e.g., cured) material. Curable materials are typically polymerizable materials, which undergo polymerization and/or cross-linking when exposed to a suitable curing condition (e.g., energy source), typically in the presence of an agent for promoting the polymerization and/or cross-linking.

A curable material, according to the present embodiments, also encompasses materials which harden or solidify (cure) without being exposed to a curing energy, but rather to a curing condition (for example, upon exposure to a chemical reagent), or simply upon exposure to the environment.

The terms "curable" and "solidifyable" as used herein are interchangeable.

The polymerization can be, for example, free-radical polymerization, cationic polymerization or anionic polymerization, and each can be induced when exposed to curing energy such as, for example, radiation, heat, etc., as described herein.

In some of any of the embodiments described herein, a curable material is a photopolymerizable material, which polymerizes and/or undergoes cross-linking upon exposure to radiation, as described herein, and in some embodiments the curable material is a UV-curable material, which polymerizes and/or undergoes cross-linking upon exposure to UV radiation, as described herein.

In some embodiments, a curable material as described herein is a photopolymerizable material that polymerizes via photo-induced free-radical polymerization. Alternatively, the curable material is a photopolymerizable material that polymerizes via photo-induced cationic polymerization.

In some of any of the embodiments described herein, a curable material can be a monomer, an oligomer or a short-chain polymer, each being polymerizable and/or cross-linkable as described herein.

In some of any of the embodiments described herein, when a curable material is exposed to a curing condition (e.g., radiation), it hardens (cured) by any one, or combination, of chain elongation and cross-linking.

In some of any of the embodiments described herein, a curable material is a monomer or a mixture of monomers which can form a polymeric material upon a polymerization reaction, when exposed to a curing condition at which the polymerization reaction occurs. Such curable materials are also referred to herein as monomeric curable materials.

In some of any of the embodiments described herein, a curable material is an oligomer or a mixture of oligomers which can form a polymeric material upon a polymerization reaction, when exposed to a curing condition at which the polymerization reaction occurs. Such curable materials are also referred to herein as oligomeric curable materials.

In some of any of the embodiments described herein, a curable material, whether monomeric or oligomeric, can be a mono-functional curable material or a multi-functional curable material.

Herein, a mono-functional curable material comprises one functional (curable) group that can undergo polymerization when exposed to a curing condition (e.g., radiation).

A multi-functional curable material comprises two or more, e.g., 2, 3, 4 or more, functional (curable) groups that can undergo polymerization when exposed to a curing condition. Multi-functional curable materials can be, for example, di-functional, tri-functional or tetra-functional curable materials, which comprise 2, 3 or 4 groups that can undergo polymerization, respectively. The two or more functional groups in a multi-functional curable material are typically linked to one another by a linking moiety, as defined herein. When the linking moiety is an oligomeric or polymeric moiety, the multi-functional group is an oligomeric or polymeric multi-functional curable material. Multifunctional curable materials can undergo polymerization and/or act as cross-linkers when subjected to a curing condition.

Whenever a "formulation" is described herein, a building material formulation is meant, preferably a modeling material formulation.

The Modeling Material Formulation:

According to an aspect of some embodiments of the present invention, there is provided a modeling material formulation that comprises a curable material or a curable system, as described herein, and one or more reinforcing material(s) (filler(s)).

By "reinforcing material", as used herein, it is meant a material that, when included in a composition, it enhances the mechanical strength of the composition. In the context of additive manufacturing and in the context of the present embodiments, a reinforcing material is a material that when included in a hardened building material (e.g., a hardened modeling material), the mechanical strength of the hardened material is increased, compared to the same formulation without the reinforcing material.

In some embodiments, an increase in the mechanical strength is reflected by an increase in a tensile strength, and/or in a flexural strength, and/or in a tensile modulus and/or in a flexural modulus.

By "Tensile strength" it is meant the maximum stress that a material can withstand while being stretched or pulled before breaking. Tensile strength may be determined, for example, according to ASTM D-638-03.

By "Tensile modulus" it is meant the stiffness of a material, defined as the relationship between stress (force per unit area) and strain (proportional deformation) in a material in the linear elasticity regime of a uniaxial deformation. Tensile modulus may be determined, for example, according to ASTM D-638-04.

By "flexural strength" it is meant the stress in a material just before it yields in a flexure test. Flexural strength may be determined, for example, according to ASTM D-790-03.

By "flexural modulus" it is meant the ratio of stress to strain in flexural deformation, which is determined from the slope of a stress-strain curve produced by a flexural test such as the ASTM D790. Flexural modulus may be determined, for example, according to ASTM D-790-04.

In some of any of the embodiments described herein, an increase in a mechanical strength as defined herein that results from an inclusion of a reinforcing material is of at least 5%, or at least 10%, preferably of at least 20%, or of at least 30%, or at least 40%, or at least 50%, or more. That is, for example, a tensile strength, and/or a flexural strength, and/or a tensile modulus and/or a flexural modulus of a hardened material that comprises a reinforcing material is higher by at least 5%, or at least 10% or more, as described herein, than a respective property of the same hardened material without the reinforcing material.

Fillers (reinforcing materials) usable in additive manufacturing are typically inorganic particles of, for example, silica, calcium carbonate, clay, carbon black, and others.

In some of any of the embodiments described herein, the filler is or comprises silica particles.

In some embodiments, the average diameter of the particles is less than 1 micron, preferably less than 500 nm, preferably less than 200 nm and preferably less than 100 nm. In these embodiments, the silica particles are referred to also as silica nanoparticles.

In some embodiment, the average diameter of the particles ranges from 10 nm to 100 nm, or from 20 nm to 100 nm, or from 20 nm to 80 nm, or from 10 nm to 50 nm, including any intermediate values and subranges therebetween.

In some embodiments, at least a portion of such particles may aggregate, upon being introduced to the formulation. In some of these embodiments, the aggregate has an average size of no more than 1 micron.

Any commercially available formulation of sub-micron silica particles is usable in the context of the present embodiments, including fumed silica, colloidal silica, precipitated silica, layered silica (e.g., montmorillonite), and aerosol assisted self-assembly of silica particles.

The silica particles can be such that feature a hydrophobic or hydrophilic surface. The hydrophobic or hydrophilic nature of the particles' surface is determined by the nature of the surface groups on the particles.

When the silica is untreated, namely, is composed substantially of Si and O atoms, the particles typically feature silanol (Si—OH) surface groups and are therefore hydrophilic. Untreated (or uncoated) colloidal silica, fumed silica, precipitated silica and layered silica all feature a hydrophilic surface, and are considered hydrophilic silica.

Layered silica may be treated so as to feature long-chain hydrocarbons terminating by quaternary ammonium and/or ammonium as surface groups, and the nature of its surface is determined by the length of the hydrocarbon chains. Hydrophobic silica is a form of silica in which hydrophobic groups are bonded to the particles' surface, and is also referred to as treated silica or functionalized silica (silica reacted with hydrophobic groups).

Silica particles featuring hydrophobic surface groups such as, but not limited to, alkyls, preferably medium to high alkyls of 2 or more carbon atoms in length, preferably of 4 or more, or 6 or more, carbon atoms in length, cycloalkyls, aryl, and other hydrocarbons, as defined herein, or hydrophobic polymers (e.g., polydimethylsiloxane), are particles of hydrophobic silica.

Silica particles as described herein can therefore be untreated (non-functionalized) and as such are hydrophilic particles.

Alternatively, silica particles as described herein can be treated, or functionalized, by being reacted so as to form bonds with the moieties on their surface.

When the moieties are hydrophilic moieties, the functionalized silica particles are hydrophilic.

Silica particles featuring hydrophilic surface groups such as, but not limited to, hydroxy, amine, ammonium, carboxy, silanol, oxo, and the like, are particles of hydrophilic silica.

When the moieties are hydrophobic moieties, as described herein, the functionalized silica particles are hydrophobic.

In some of any of the embodiments described herein, at least a portion, or all, of the silica particles feature a hydrophilic surface (namely, are hydrophilic silica particles, for example, of untreated silica such as colloidal silica).

In some of any of the embodiments described herein, at least a portion, or all, of the silica particles feature a hydrophobic surface (namely, are hydrophobic silica particles).

In some embodiments, the hydrophobic silica particles are functionalized silica particles, namely, particles of silica treated with one or more hydrophobic moieties.

In a preferred embodiment, at least a portion, or all, of the silica particles are functionalized by curable functional groups (particles featuring curable groups on their surface).

The curable functional groups can be any polymerizable groups as described herein. In some embodiments, the curable functional groups are polymerizable by the same polymerization reaction as the curable monomers in the formulation, and/or when exposed to the same curing condition as the curable monomers. In some embodiments, the curable groups are (meth)acrylic (acrylic or methacrylic) groups, as defined herein.

By "at least a portion", as used in the context of the present embodiments, it is meant at least 10%, or at least 20%, or at least 30%, or at least 40%, or at least 50%, or at least 60%, or at least 70%, or at least 80%, or at least 90%, or at least 95%, or at least 98%, of the particles.

The silica particles may also be a mixture of two or more types of silica particles, for example, two or more types of any of the silica particles described herein.

In some embodiments, the silica particles are silica nanoparticles featuring acrylate and/or methacrylate groups on their surface.

In some of any of the embodiments described herein, an amount of the silica particles is at least 10% by weight of the total weight of the formulation.

In some of any of the embodiments described herein, an amount of the silica particles ranges from 10% to 30%, or from 10% to 25%, or from 10% to 20 &, or from 15% to 20%, by weight of the total weight of the formulation, including any intermediate values and subranges therebetween.

In exemplary embodiments, an amount of the silica particles is 17.5% by weight of the total weight of the formulation.

In some of any of the embodiments described herein, the modeling material formulation comprises a mixture of monofunctional and multi-functional curable materials and the amounts (concentrations) and chemical compositions thereof are selected so as to provide a formulation that meets the requirements of 3D-inkjet printing.

In some of any of the embodiments described herein, the formulation comprises at least the following curable materials: a first multi-functional curable material, a second multi-functional curable material, and a monofunctional curable material.

In some of any of the embodiments described herein, the first multi-functional curable material is characterized as having a molecular weight of from 300 gram/mol to 1,000 gram/mol.

In some of any of the embodiments described herein, the first multi-functional curable material is characterized as featuring, when hardened, Tg of at least 50° C. In some of these embodiments, the material is such that features, when hardened, Tg that ranges from 50 to 250° C.

In some of any of the embodiments described herein, the first multi-functional curable material is characterized as having a molecular weight of from 300 gram/mol to 1,000 gram/mol and/or as featuring, when hardened, Tg of at least 50° C., as described herein.

Herein throughout, "Tg" refers to glass transition temperature defined as the location of the local maximum of the E" curve, where E" is the loss modulus of the material as a function of the temperature.

Broadly speaking, as the temperature is raised within a range of temperatures containing the Tg temperature, the state of a material, particularly a polymeric material, gradually changes from a glassy state into a rubbery state.

Herein, "Tg range" is a temperature range at which the E" value is at least half its value (e.g., can be up to its value) at the Tg temperature as defined above.

Without wishing to be bound to any particular theory, it is assumed that the state of a polymeric material gradually changes from the glassy state into the rubbery within the Tg range as defined above. Herein, the term "Tg" refers to any temperature within the Tg range as defined herein.

Herein throughout, whenever a curable material is defined by a property of a hardened material obtained therefrom, it is to be understood that this property is for a hardened material obtained from this curable material per se.

Herein, an "ethoxylated" material describes a curable material (e.g., an acrylic or methacrylic compound) which comprises one or more alkylene glycol groups, or, preferably, one or more alkylene glycol chains, as defined herein. Ethoxylated curable (e.g., (meth)acrylate) materials can be monofunctional, or, preferably, multifunctional, namely, difunctional, trifunctional, tetrafunctional, etc.

In multifunctional materials, typically, each of the curable (e.g., (meth)acrylate) groups are linked to an alkylene glycol group or chain, and the alkylene glycol groups or chains are linked to one another through a linking moiety. The linking moiety can be a branching unit, such as, for example, a linear (in case of a difunctional material) or branched alkyl, cycloalkyl, aryl (e.g., bisphenol A), etc. (in case of di-, tri- and higher functional materials).

In some of any of the embodiments described herein, the first multi-functional curable material is an ethoxylated curable material which comprises at least 3 alkylene glycol groups.

In some of these embodiments, the first multi-functional curable material is an ethoxylated curable material which comprises no more than 10, or no more than 8, or no more than 6, or no more than 4, ethoxylated groups, that is, alkylene glycol moieties or groups. Some or all of the alkylene glycol groups can be linked to one another to form an alkylene glycol chain. For example, an ethoxylated material that comprises 3 ethoxylated groups can comprise 3 alkylene glycol groups linked to one another, or 2 alkylene glycol moieties linked to one another and to the branching unit and another alkylene glycol moiety linked to a branching unit, or three alkylene glycol groups each linked to a branching unit.

In some embodiments, the first multi-functional curable material is an ethoxylated curable material which comprises three alkylene glycol groups.

In some embodiments, the first multi-functional curable material is an ethoxylated curable material which comprises an aliphatic branching unit, such as an alkyl or cycloalkyl, to which alkylene glycol groups or chains are linked.

In some embodiments, the first multi-functional curable material is an ethoxylated curable material which comprises a branched alkyl as the branching unit and at least 3 alkylene glycol groups or chains linked to the branching unit.

In some embodiments, each alkylene group or chain terminates by a curable group, such that, in case there are 3 alkylene glycol groups or chains, the material is tri-functional curable material, in case there are four alkylene glycol groups or chains, the material is tetra-functional curable material, and in case there are two alkylene glycol groups or chains that material is di-functional curable material.

In some embodiments, the first multi-functional curable material is a tri-functional ethoxylated curable material.

In exemplary embodiments, the branching unit is derived from trimethylol alkyl (e.g., trimethylolpropane propane), and three alkylene groups or chains are each linked to a methylene group.

Exemplary such curable materials can be collectively represented by the following Formula:

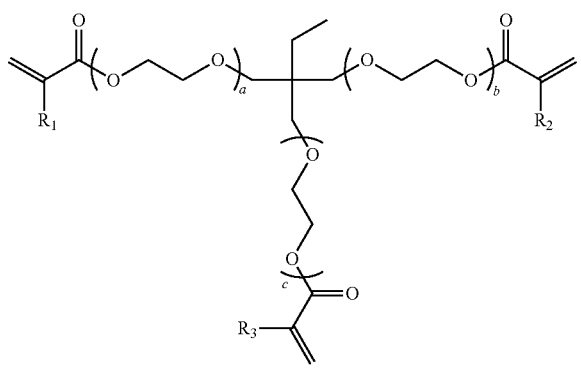

wherein $R_1$, $R_2$ and $R_3$ are each independently hydrogen (for an acrylate curable group) or methyl (for methacrylate curable group); and a, b, and c are each independently an integer being 0, 1, 2, or 3. In a preferred embodiment, the sum of a, b and c is 3.

The sum of a+b+c can be 3 or higher, e.g., 4, 5, 6, 7, 8, 9 or 10, as long as the curable material features MW and/or Tg as defined herein.

In exemplary embodiments, the ethoxylated curable material usable as the first multi-functional material is a material marketed by Sartomer, for example SR454, SR 306, SR9003 or SR494.

In some of any of the embodiments described herein, the first multi-functional material is non-ethoxylated, that is, it does not include alkylene glycol groups or includes only 1 or 2 alkylene glycol groups.

In some of these embodiments, the first multi-functional curable material has an aliphatic linking moiety, for example, an aliphatic hydrocarbon, as described herein. In some embodiments, the hydrocarbon does not comprise heteroatoms.

In some of these embodiments, the linking moiety is or comprises an all-carbon alicyclic moiety, optionally a polyalicyclic moiety which comprises 2, 3 or more rings. In some embodiments, the alicyclic moiety is of at least 6, at least 7, at least 8, at least 9 or at least 10, carbon atoms.

In some embodiments, the linking moiety comprises a polyalicyclic moiety as described herein, in which the two or more rings are fused to one another.

An exemplary such multi-functional curable material is tricyclododecane dimethanol diacrylate (e.g., SR833, marketed by Sartomer).

In some of any of the embodiments described herein, the silica particles are pre-dispersed in the first multi-functional curable material as described herein in any of the respective embodiments.

According to some of these embodiments, the formulation comprises a pre-dispersion (a dispersion that is prepared prior to mixing with other components) of the silica particles in the first multi-functional curable material, mixed with the other components of the formulation as described herein in any of the respective embodiments. In some embodiments, the dispersion is a commercially available dispersion, such as, for example, a dispersion marketed as Laromer 9026 or Laromer 8863. In some other embodiments, the dispersion is prepared with a first multi-functional curable of choice.

In some of any of the embodiments described herein, an amount of the first multi-functional curable material as described herein is in a range of from 10 to 30%, or from 15 to 20%, by weight, of the total weight of the formulation, including any intermediate values and subranges therebetween.

In some of any of the embodiments described herein, an amount of a dispersion comprising the silica particles and the first multi-functional curable material as described herein is in a range of from 20 to 60%, or from 30 to 40%, by weight, of the total weight of the formulation, including any intermediate values and subranges therebetween.

In some of any of the embodiments described herein, a weight ratio of the silica particles and the first multi-functional curable material in a dispersion ranges from 1:2 to 2:1, and is preferably 1:1.

Formulations according to the present embodiments are preferably prepared while employing a pre-prepared dispersion of the filler in a curable material, preferably the first multi-functional curable material, and contacting (e.g., mixing) the pre-prepared dispersion with the other components of the formulation, at amounts and/or weight ratios as described herein in any of the respective embodiments. In some of these embodiments, the amount of the components are such that the final mixture comprises from 20 to 60% by weight of the pre-dispersion.

In some of any of the embodiments described herein, the second multi-functional curable material is characterized as having a molecular weight lower than 1,000 gram/mol.

In some of any of the embodiments described herein, the second multi-functional curable material is characterized as featuring, when hardened, Tg of at least 80° C. In some of these embodiments, the second multi-functional curable material features, when hardened, Tg of from about 80 to about 250° C.

In some of any of the embodiments described herein, the second multi-functional curable material is characterized as having a molecular weight lower than 1,000 gram/mol and/or as featuring, when hardened, Tg of at least 80° C., as described herein.

In some embodiments, the second multi-functional curable material has a molecular weight in a range of from 300 to 1,000 grams/mol or from 400 to 1,000 grams/mol or from 500 to 1,000 grams/mol.

In some embodiments, the second multi-functional curable material is an ethoxylated curable material, and is also referred to herein as a second ethoxylated multi-functional curable material. In some embodiments, the second multi-functional curable material is an ethoxylated curable material that comprises a total number of alkylene glycol groups of from 2 to 10, or from 2 to 8, or from 2 to 6 alkylene glycol groups. The alkylene glycol groups can be linked to one another to form 1, 2, 3 or more alkylene glycol chains, each being linked to the branching unit.

In some embodiments, the second multi-functional curable material is an ethoxylated curable material which comprises two or more alkylene glycol chains, each comprising 1, 2, 3 or 4 alkylene glycol groups linked to one another, and each chain is linked to the branching unit.

In some embodiments, the second multi-functional curable material is an ethoxylated curable material which comprises two alkylene glycol chains, each comprising 1, 2, 3 or 4 alkylene glycol groups linked to one another, and each chain is linked to the branching unit.

In some embodiments, the second multi-functional curable material is a di-functional curable material. In some of these embodiments, the second multi-functional curable material is an ethoxylated di-functional curable material which comprises two alkylene glycol chains, each comprising 1, 2, 3 or 4 alkylene glycol groups linked to one another, and each chain is linked to the branching unit and is terminated by a curable group.

In some of any of the embodiments described herein for the second multi-functional curable material, the branching unit is an aromatic branching, that is, it comprises one or more aryl and/or heteroaryl groups.

In some embodiments, the second multi-functional curable material is a difunctional material, and the branching unit is accordingly a difunctional unit. In exemplary embodiments, the branching unit is or comprises a bisphenol A moiety (derived from 2,2-bis(4-hydroxyphenyl) propane). In some of these embodiments, the bisphenol A moiety is linked to two alkylene glycol chains, each comprising 1 to 4 alkylene glycol groups, and each terminated by a curable group.

In some of any of the embodiments described herein, the curable groups in the second multi-functional curable material are acrylic groups, e.g., acrylate and/or methacrylate. Preferably, one or more of the curable groups are methacrylate groups.

In exemplary embodiments, the second multi-functional curable material is an ethoxylated bisphenol A dimethacrylate. Commercially available materials include, for example, SR540, SR348L, SR542, SR480, SR601E and SR541, all marketed by Sartomer.

In some of any of the embodiments described herein, an amount of the second multi-functional curable material is from 10% to 30%, or from 15% to 25%, by weight, of the total weight of the formulation, including any intermediate value and subranges therebetween.

In some of any of the embodiments described herein, the monofunctional curable material is characterized as having a molecular weight of no more than 300 gram/mol.

In some embodiments, the monofunctional curable material features a Tg higher than 50, or higher than 80, or higher than 100, ° C., and in some embodiments the Tg ranges from 50 to 250° C.

In some embodiments, the monofunctional curable material is hydrophilic.

As used herein throughout, the term "hydrophilic" describes a physical property of a compound or a portion of a compound (e.g., a chemical group in a compound) which accounts for transient formation of bond(s) with water molecules, typically through hydrogen bonding.

A hydrophilic compound or portion of a compound (e.g., a chemical group in a compound) is one that is typically charge-polarized and capable of hydrogen bonding.

Hydrophilic compounds or groups typically include one or more electron-donating heteroatoms which form strong hydrogen bonds with water molecules. Such heteroatoms include, but are not limited to, oxygen and nitrogen. Preferably, a ratio of the number of carbon atoms to a number of heteroatoms in a hydrophilic compounds or groups is 10:1 or lower, and can be, for example, 8:1, more preferably 7:1, 6:1, 5:1 or 4:1, or lower. It is to be noted that hydrophilicity of compounds and groups may result also from a ratio between hydrophobic and hydrophilic moieties in the compound or chemical group, and does not depend solely on the above-indicated ratio.

Hydrophilic compounds dissolve more readily in water than in oil or other hydrophobic solvents. Hydrophilic compounds can be determined by, for example, as having Log P lower than 0.5, when Log P is determined in octanol and water phases.

Hydrophilic materials can alternatively, or in addition, be determined as featuring a lipophilicity/hydrophilicity balance (HLB), according to the Davies method, of at least 10, or of at least 12. Hydrophilic compounds are typically characterized as water-soluble or water-miscible, featuring a solubility in water, at 20° C., of at least 1 gram/100 grams water.

A hydrophilic compound can have one or more hydrophilic groups that render the compound hydrophilic. Such groups are typically polar groups, comprising one or more electron-donating heteroatoms such as oxygen and nitrogen. The hydrophilic group can be, for example, one or more substituent(s) of a monomeric mono-functional curable material or two or more substituents or interrupting groups of an oligomeric mono-functional curable material.

Exemplary hydrophilic groups include, but are not limited to, an electron-donating heteroatom, a carboxylate, a thiocarboxylate, oxo (=O), a linear amide, hydroxy, a (C1-4) alkoxy, an (C1-4)alcohol, a heteroalicyclic (e.g., having a ratio of carbon atoms to heteroatoms as defined herein), a cyclic carboxylate such as lactone, a cyclic amide such as lactam, a carbamate, a thiocarbamate, a cyanurate, an isocyanurate, a thiocyanurate, urea, thiourea, an alkylene glycol (e.g., ethylene glycol or propylene glycol), and a hydrophilic polymeric or oligomeric moiety, as these terms are defined hereinunder, and any combinations thereof (e.g., a hydrophilic group that comprises two or more of the indicated hydrophilic groups).

In some embodiments, the hydrophilic group is, or comprises, an electron donating heteroatom, a carboxylate, a heteroalicyclic, an alkylene glycol and/or a hydrophilic oligomeric moiety.

A hydrophilic monofunctional curable material according to some embodiments of the present invention can be a vinyl-containing compound represented by Formula I:

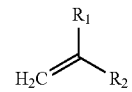

Formula I wherein at least one of $R_1$ and $R_2$ is and/or comprises a hydrophilic group, as defined herein.

The (=CH$_2$) group in Formula I represents a polymerizable group, and is typically a UV-curable group, such that the material is a UV-curable material.

For example, $R_1$ is a hydrophilic group as defined herein and $R_2$ is a non-hydrophilic group, for example, hydrogen, C(1-4) alkyl, C(1-4) alkoxy, or any other substituent, as long as the compound is hydrophilic, as defined herein.

In some embodiments, $R_1$ is a carboxylate, and the compound is a mono-functional acrylate. In some of these embodiments, $R_2$ is methyl, and the compound is mono-functional methacrylate. In other embodiments, $R_2$ is a hydrophilic substituent, namely, a substituent which is, or which comprises, a hydrophilic group as described herein.

In some of any of these embodiments, the carboxylate group, —C(=O)—OR', comprises R' which is a hydrophilic group. Exemplary R' groups include, but are not limited to, heteroalicyclic groups (having a ratio of 5:1 or lower of carbon atoms to electron-donating heteroatoms, such as morpholine, tetrahydrofurane, oxalidine, and the likes), hydroxyl, C(1-4)alkoxy, thiol, alkylene glycol or a polymeric or oligomeric moiety, as described herein. An exemplary hydrophilic mono-functional acrylate is 4-acryloyl morpholine (ACMO).

In some of any of the embodiments described herein, the amount of the mono-functional curable material is from 10% to 40%, or from 20% to 40%, or from 25%, to 35%, by weight, of the total weight of the formulation, including any intermediate values and subranges therebetween.

In some embodiments of the present invention, the formulation comprises:

Silica particles, as described herein in any of the respective embodiments, in an amount of 10-20% by weight;

a first multi-functional curable material as described herein in any of the respective embodiments, in an amount of from 10 to 30%, or from 15 to 20%, by weight;

a second ethoxylated multi-functional curable material, as described herein in any of the respective embodiments, in an amount of from 10% to 30%, by weight; and a monofunctional, preferably hydrophilic, curable material having a molecular weight of no more than 300 gram/mol, in an amount of from 10 to 50% by weight.

In some of any of the embodiments described herein, the formulation comprises an additional monofunctional or difunctional curable material, in an amount of from 10 to 20% by weight. The additional curable material is preferably characterized as having a molecular weight of no more than 1,000 gram/mol and/or as featuring, when hardened, a Tg lower than 50° C.

The additional curable material can be hydrophilic or hydrophobic.

Exemplary additional curable materials include aliphatic urethane acrylates or diacrylates, such as those marketed by Sartomer as CN9002, CN980, CN981, CN991, or those marketed as the Genomer family, e.g., Genomer 1122.

In some embodiments, the additional curable material does not comprise urethane moieties.

In some embodiments, the additional curable material is a monofunctional curable material.

Exemplary additional mono-functional curable materials include those marketed by Sartomer as CN131B and isobornyl acrylate (IBOA).

Exemplary Modeling Material Formulations:

In some of any of the embodiments described herein, each of the curable materials is a UV-curable material.

In some of any of the embodiments described herein, each of the curable materials is a UV-curable acrylic material, as defined herein.

In some of any of the embodiments described herein, each of the curable materials is a UV-curable acrylate or methacrylate.

In exemplary embodiments, each of the curable materials is a UV-curable acrylate.

In exemplary embodiments, each of the curable materials, except the second ethoxylated curable material, is a UV-curable acrylate, and the second ethoxylated curable material is a UV-curable methacrylate.

In exemplary embodiments, the formulation comprises:

20-60%, or 30-60%, by weight silica particles pre-dispersed in the first multi-functional curable material;

10-30% by weight of the second multi-functional curable material;

25-30% by weight of the monofunctional curable material; and 15-20% by weight of the additional curable material, wherein all of these components are as defined in any of the respective embodiments and any combination thereof.

In exemplary embodiments of the formulation of the present embodiments:

the silica particles are (meth)acrylic-functionalized silica nanoparticles;

the first multi-functional curable material is a tri-functional ethoxylated curable material comprising 3 acrylate groups, at least three alkylene glycol groups and an aliphatic branching unit;

the second multi-functional material is a di-functional curable material comprising two methacrylate groups and an aromatic branching unit; and the monofunctional curable material is a hydrophilic monoacrylate.

In exemplary embodiments of the formulation of the present embodiments:

the silica particles are (meth)acrylic-functionalized silica nanoparticles;

the first multi-functional curable material is a di-functional curable material featuring a linking moiety that comprises an alicyclic all-carbon group;

the second multi-functional material is a di-functional curable material comprising two methacrylate groups and an aromatic branching unit; and the monofunctional curable material is a hydrophilic monoacrylate.

In exemplary embodiments, the formulation comprises:

20-60%, or 30-60%, by weight silica particles pre-dispersed in the first multi-functional curable material, wherein the silica particles are (meth)acrylic-functionalized silica nanoparticles, and the first multi-functional curable material is a tri-functional ethoxylated curable material comprising 3 acrylate groups, at least three alkylene glycol groups and an aliphatic branching unit;

10-30% by weight of the second multi-functional curable material, and the second multi-functional material is a di-functional ethoxylated curable material comprising two methacrylate groups and an aromatic branching unit;

20-50% by weight of the monofunctional curable material which is a hydrophilic material; and 10-30% by weight of the additional curable material, wherein all of these components are as defined in any of the respective embodiments and any combination thereof.

In exemplary embodiments, the formulation comprises:

20-60%, or 30-60%, by weight silica particles pre-dispersed in the first multi-functional curable material, wherein the silica particles are (meth)acrylic-functionalized silica nanoparticles, and the first multi-functional curable material is a di-functional curable material featuring a linking moiety that comprises an alicyclic all-carbon group;

10-30% by weight of the second multi-functional curable material, and the second multi-functional material is a di-functional ethoxylated curable material comprising two methacrylate groups and an aromatic branching unit;

20-50% by weight of the monofunctional curable material which is a hydrophilic material; and 10-30% by weight of the additional curable material, wherein all of these components are as defined in any of the respective embodiments and any combination thereof.

In some of any of the embodiments described herein, the total amount of multi-functional curable materials is no more than 60% or no more than 50%, by weight of the total weight of the formulation or of the total weight of the curable materials in the formulation.

In some of any of the embodiments described herein, the total amount of mono-functional curable materials is from 20% to 80%, or from 20 to 50%, by weight of the total weight of the formulation, including any intermediate values and subranges therebetween.

In some of any of the embodiments described herein, the modeling material formulation further comprises an initiator (an agent that promotes curing, e.g., polymerization, of the curable materials), for initiating polymerization of the curable materials.

When all curable materials are photopolymerizable, e.g., UV-curable, a photoinitiator is usable in these embodiments.

Non-limiting examples of suitable photoinitiators include benzophenones (aromatic ketones) such as benzophenone, methyl benzophenone, Michler's ketone and xanthones; acylphosphine oxide type photo-initiators such as 2,4,6-trimethylbenzolydiphenyl phosphine oxide (TMPO), 2,4,6-trimethylbenzoylethoxyphenyl phosphine oxide (TEPO), and bisacylphosphine oxides (BAPO's); benzoins and bezoin alkyl ethers such as benzoin, benzoin methyl ether and benzoin isopropyl ether and the like. Examples of photoinitiators are alpha-amino ketone, bisacylphosphine oxide (BAPO's), and those marketed under the tradename Irgacure®.

A photo-initiator may be used alone or in combination with a co-initiator. Benzophenone is an example of a photoinitiator that requires a second molecule, such as an amine, to produce a free radical. After absorbing radiation, benzophenone reacts with a ternary amine by hydrogen abstraction, to generate an alpha-amino radical which initiates polymerization of acrylates. Non-limiting example of a class of co-initiators are alkanolamines such as triethylamine, methyldiethanolamine and triethanolamine.

In some embodiments, a photoinitator system that comprises two or more initiators is usable. In exemplary embodiments, a photoinitiator system that comprises one (or more) photoinitiator(s) of the aromatic ketones family and one (or more) photoinitiator(s) of the TMPO or TEPO family, is used.

A total concentration of a photoinitiator in a formulation containing same may range from about 0.1 to about 6 weight percents, or from about 1 to about 6, or from about 2 to about 6, or from about 3 to about 6, or from about 3 to about 5, weight percents, including any intermediate value and subranges therebetween.

According to some of any of the embodiments described herein, the modeling material formulation further comprises one or more additional, non-curable material(s), for example, one or more of a colorant, a dispersant, a surfactant, a stabilizer and an inhibitor.

An inhibitor is included in the formulation for preventing or slowing down polymerization and/or curing prior to exposing to the curing condition. Commonly used inhibitors, such as radical inhibitors, are contemplated.

Commonly used surfactants, dispersants, colorants and stabilizers are contemplated. Exemplary concentrations of each component, if present, range from about 0.01 to about 1, or from about 0.01 to about 0.5, or from about 0.01 to about 0.1, weight percents, of the total weight of the formulation containing same.

In some of any of the embodiments described herein, the modeling material formulation features rheological and physical properties that meet the requirements of 3D-inkjet printing.

In some of any of the embodiments described herein the formulation features a viscosity of from 8 to 30, or of from 8 to 20, or of from 10 to 20, centipoises at 75° C., when determined on a Brookfield rheometer.

In some of any of the embodiments described herein the formulation features a surface tension of at least 20, or at least 25, dyne/cm, for example, of from 20 to 50, or from 20 to 40, or from 25 to 4, or from 25 to 30, dyne/cm, at 20° C.

In some of any of the embodiments described herein, the formulation features, when hardened, at least one of the following characteristics:

Tensile strength, as defined herein, of at least 70 MPa; and/or

Tensile Modulus, as defined herein, of at least 3000, or at least 3300, MPa; and/or Flexural strength of at least 100, or at least 110, or at least 120, MPa; and/or Flexural modulus of at least 3500, or at least 3800, or at least 4000, MPa.

Multi-Formulation System:

The modeling material formulation as described herein can be used in combination with additional one or more modeling material formulation(s), for forming multi-material objects.

The two or more formulations which are used in combination for forming multi-material objects are referred to herein as multi-formulation system, which comprises two or more formulations.

The phrase "multi-formulation system" therefore relates to two or more modeling material formulations which are to be used in combination for forming multi-material objects.

According to some embodiments of the present invention, there is provided a multi-formulation system that comprises a first formulation which is the modeling material formulation that contains a reinforcing material as described herein, and an additional, second, modeling material formulation which is different from the first formulation. The multi-formulation system can comprise a further additional, third, formulation.

In some embodiments, the multi-formulation system comprises two (or more) modeling material formulations that are suitable for forming objects featuring layered, e.g., shelled, structure(s) or object(s), as described hereinunder and exemplified in FIGS. 5A-D and 6.

In some embodiments, there is provided a multi-formulation system that comprises at least two modeling material formulations, at least one of the formulations is a first formulation which is the modeling material formulation containing a reinforcing material as described herein, and at least one another, second formulation which differs from the first formulation by at least one of HDT, Izod Impact and elastic moduli.

As used herein, the term "Izod impact", which is also referred to as "Izod notch impact resistance" or simply as "impact resistance" refers to the loss of energy per unit of thickness following an impact force applied to the respective formulation or combination of formulations. Suitable test procedures for determining the Izod impact resistance of a formulation or combination of formulations are the ASTM D-256 series, particularly the ASTM D-256-06 series. In some embodiments of the present invention Izod impact resistance values are measured by any method of the ASTM D-256-06 series. These values are also referred to herein as Izod impact (notched).

It is noted that in the standard ASTM methods there is a need to machinate a notch. However, in many cases, evaluating the impact resistance of an object or a part thereof that is prepared by AM (e.g., three-dimensional inkjet printing) is performed using the following procedures.

According to a first procedure, a test specimen is printed with a rectangular patch made of the shelling formulation or combination of formulations. The dimensions of the patch are calculated in such way that after the notch preparation (as required by the standard ASTM procedure) a 0.25-mm layer of the shelling formulation or combination of formulations remains complete.

According to a second procedure, a test specimen is printed with notch instead of cutting the notch after the specimen is printed. The orientation of the specimen on the tray is vertical, for example, in the Z—Y plane (referred to herein as "orientation F").

The values determined by these procedures are referred to herein as Izod impact (printed).

As used herein, HDT or "heat deformation temperature" refers to a temperature at which the respective formulation or combination of formulations deforms under a predetermined load at some certain temperature. Suitable test procedures for determining the HDT of a formulation or combination of formulations are the ASTM D-648 series, particularly the ASTM D-648-06 and ASTM D-648-07 methods.

In various exemplary embodiments of the invention HDT values are measured by the ASTM D-648-06 method as well as by the ASTM D-648-07 method. In some embodiments of the present invention HDT values are measured by any method of the ASTM D-648 series. In the majority of the examples herein, HDT at a pressure of 0.45 MPa was used.

In some of these embodiments, the second formulation features, when hardened, HDT which is lower than the HDT of the first formulation (e.g., by at least 20, at least 30, at least 40 or at least 35, ° C.) and/or an Izod Impact which is higher than the Izod impact of the first formulation (e.g., by at least 5, at least 10, at least 15, at least 20, at least 25, at least 30, at least 35, at least 40, at least 45, or at least 50 J/m).

In some of these embodiments, a ratio between elastic moduli of the first and the second modeling formulations, when hardened, is less than 3.

An exemplary second formulation usable in the context of these embodiments is marketed by Stratasys as RGD515 or FC515.

According to an aspect of some embodiments of the present invention there are provided kits comprising the modeling material formulation as described herein, or a multi-formulation system comprising same, as described herein.

In some of the embodiments where the kit comprises a multi-formulation system, each formulation is packaged individually within the kit.

In some embodiments, all the components of a formulation are packaged together. In some of these embodiments, the formulations are packaged in a packaging material which protects the formulations from exposure to light or any other radiation and/or comprises an inhibitor.

In some embodiments, the formulation(s) further comprises an initiator (e.g., a photoinitiator or a photoinitiator system, as described herein), and the initiator is packaged separately from other components of each formulation, and the kit comprises instructions to add the initiator to the respective formulation.

The Method:

According to an aspect of some embodiments of the present invention there is provided a method of additive manufacturing of a three-dimensional object, as described herein. The method of the present embodiments is usable for manufacturing an object having, in at least a portion thereof, a reinforced material, as defined herein.

The method is generally effected by sequentially forming a plurality of layers in a configured pattern corresponding to the shape of the object, such that formation of each of at least a few of said layers, or of each of said layers, comprises dispensing a building material (uncured) which comprises one or more modeling material formulation(s), and exposing the dispensed modeling material to curing energy to thereby form a cured modeling material, as described in further detail hereinafter.

According to embodiments of the present invention, the one or more modeling material formulation(s) comprise one or more curable materials as defined herein and filler particles, e.g., silica nanoparticles as described herein.

In some exemplary embodiments of the invention an object is manufactured by dispensing a building material (uncured) that comprises two or more different modeling material formulations, each modeling material formulation from a different array of nozzles of the inkjet printing apparatus, as described herein. The modeling material formulations are optionally and preferably deposited in layers during the same pass of the printing heads. The modeling material formulations and/or combination of formulations within the layer are selected according to the desired properties of the object, and as further described in detail hereinbelow.

The phrase "digital materials", as used herein and in the art, describes a combination of two or more materials on a microscopic scale or voxel level such that the printed zones of a specific material are at the level of few voxels, or at a level of a voxel block. Such digital materials may exhibit new properties that are affected by the selection of types of materials and/or the ratio and relative spatial distribution of two or more materials.

In exemplary digital materials, the modeling material of each voxel or voxel block, obtained upon curing, is independent of the modeling material of a neighboring voxel or voxel block, obtained upon curing, such that each voxel or voxel block may result in a different model material and the new properties of the whole part are a result of a spatial combination, on the voxel level, of several different model materials.

As used herein, a "voxel" of a layer refers to a physical three-dimensional elementary volume within the layer that corresponds to a single pixel of a bitmap describing the layer. The size of a voxel is approximately the size of a region that is formed by a building material, once the building material is dispensed at a location corresponding to the respective pixel, straightened, and solidified.

Herein throughout, whenever the expression "at the voxel level" is used in the context of a different material and/or properties, it is meant to include differences between voxel blocks, as well as differences between voxels or groups of few voxels. In preferred embodiments, the properties of the whole part are a result of a spatial combination, on the voxel block level, of several different model materials.

Figure 4:
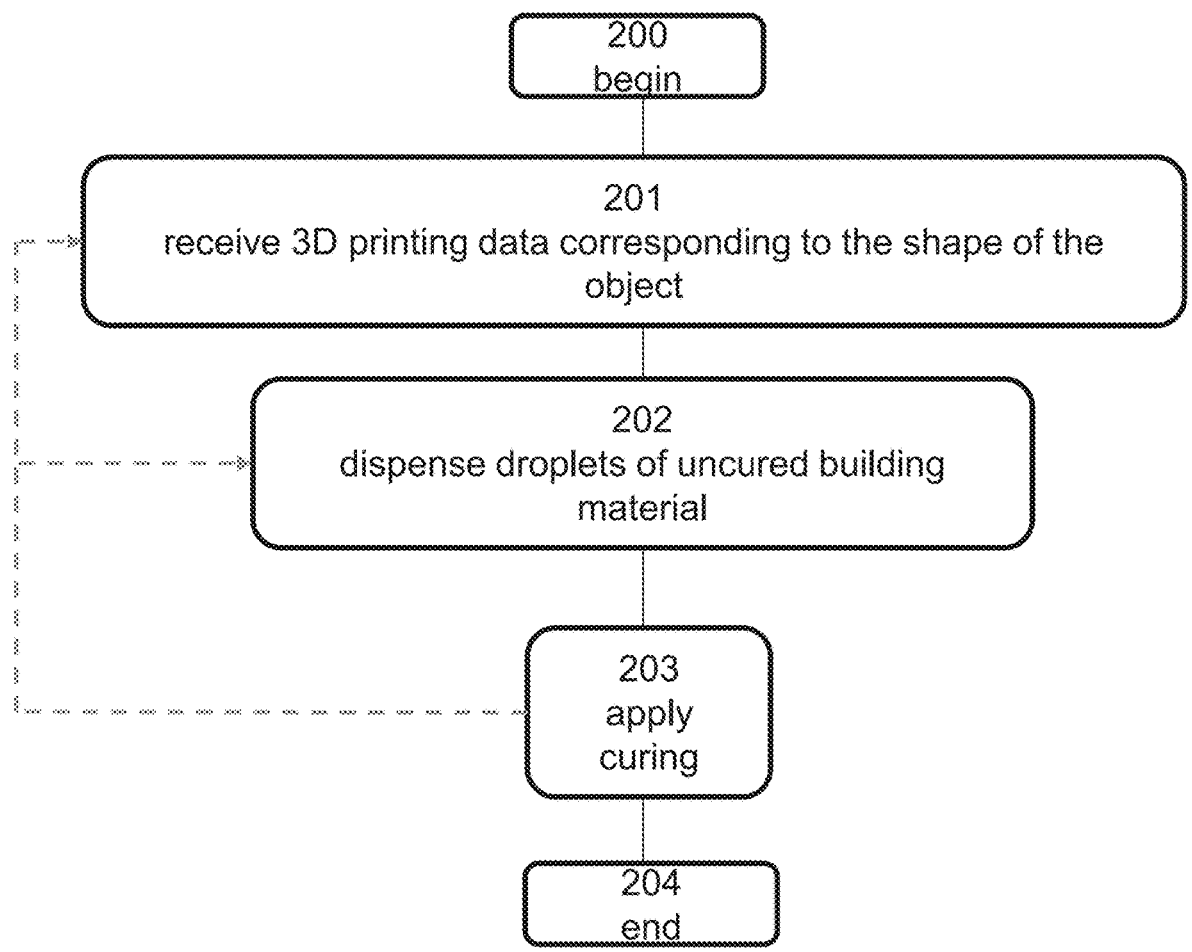
FIG. 4 is a flowchart diagram of a method suitable for fabricating an object by additive manufacturing according to aspects of some embodiments of the present invention.
Figure 5A:
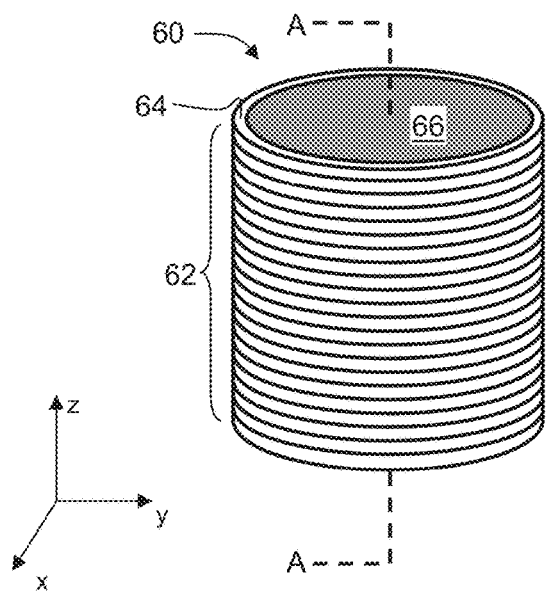
Figure 5B:
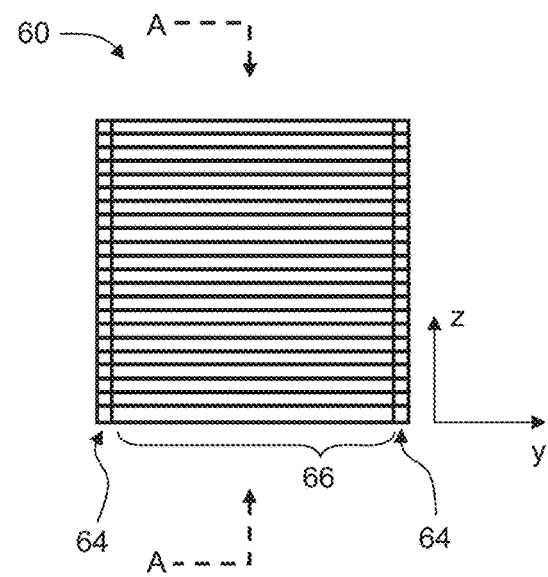
Figure 5C:
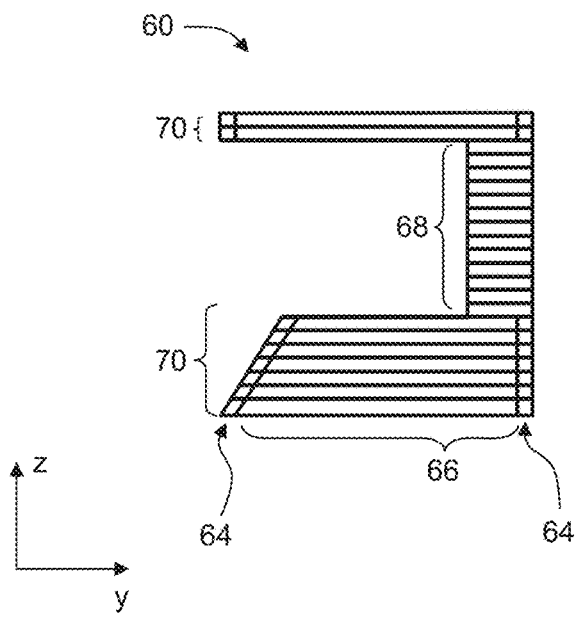
Figure 5D:
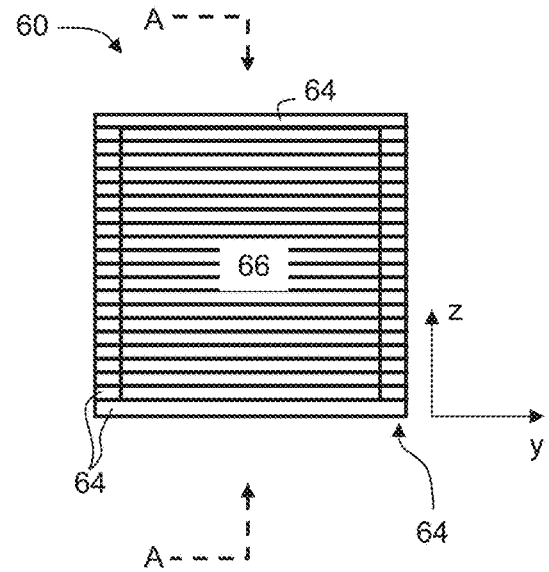

FIG. 4 is a flowchart diagram of a method suitable for AM of a three-dimensional object according to various exemplary embodiments of the present invention. It is to be understood that, unless otherwise defined, the operations described hereinbelow can be executed either contemporaneously or sequentially in many combinations or orders of execution. Specifically, the ordering of the flowchart diagrams is not to be considered as limiting. For example, two or more operations, appearing in the following description or in the flowchart diagrams in a particular order, can be executed in a different order (e.g., a reverse order) or substantially contemporaneously. Additionally, several operations described below are optional and may not be executed.

The method can be executed by an AM system (e.g., system 110 or system 10), preferably a 3D inkjet printing system, operated by a controller (e.g., controller 152 or 20). The method begins at 200 and optionally and preferably proceeds to 201 at which computer object data that collectively pertain to a three-dimensional shape of the object are received. The data can be received by a data processor (e.g., processor 154 or 24) operatively associated with the AM system. For example, the data processor can access a computer-readable storage medium (not shown) and retrieve the data from the medium. The data processor can also generate the data, or a portion thereof, instead of, or in addition to, retrieving data from the storage medium, for example, by means of a computer aided design (CAD) or computer aided manufacturing (CAM) software. The computer object data typically include a plurality of slice data each defining a layer of the object to be manufactured. The data processor can transfer the data, or a portion thereof, to the controller of the AM system. Typically, but not necessarily, the controller receives the data on a slice-by-slice basis.

The data can be in any data format known in the art, including, any of the aforementioned computer object data formats.

The method proceeds to 202 at which droplets of one or more modeling material formulation(s) are dispensed to form a layer in a configured pattern corresponding to a shape of a slice of the object. The modeling material formulation(s) are as described herein in any of the respective embodiments and any combination thereof.

The dispensing 202 is optionally and preferably executed while heating the dispensing heads, the fabrication chamber and the dispensed formulation. In various exemplary embodiments of the invention the dispensing 202 is executed at a temperature that ranges from about 50 to about 90° C., or from about 50 to about 80° C. or from about 70 to about 80° C., or from about 65 to about 75° C. The dispensing head can include a heating device or is fed via a building material reservoir which includes a heating device.

At 203 curing radiation is applied to the newly formed layer, preferably using a radiation source (e.g., device 324 or 18).

From operation 203 the method optionally and preferably loops back to 201 to receive data for another slice. When the data for the next slice is already stored within the controller, the method can loop back to 202 for forming the next layer. Once an object formed of a plurality of layers is fabricated, the method ends at 204.

In some embodiments, the dispensing is of two or more modeling material formulations, as described herein.

In some of these embodiments, the dispensing is such that the formulation containing the reinforcing material (a first formulation) forms a core region, a second formulation forms an outer region at least partially surrounding an inner envelope region, and an inner envelope region at least partially surrounding the core region is formed using both formulations (an intermixed, stitch layer).

The second modeling formulation preferably differs from the first formulation, when hardened, by at least one of: Heat Deflection Temperature (HDT), Izod Impact resistance, Tg and elastic modulus, as described herein.

In some of any of the embodiments of the present invention, once the layers are dispensed as described herein, exposure to a curing condition (e.g., curing energy) as described herein is effected. In some embodiments, the curable materials are UV-curable materials and the curing condition is such that a radiation source emits UV radiation.

In some embodiments, where the building material comprises also support material formulation(s), the method proceeds to removing the hardened support material (e.g., thereby exposing the adjacent hardened modeling material). This can be performed by mechanical and/or chemical means, as would be recognized by any person skilled in the art. A portion of the support material may optionally remain upon removal, for example, within a hardened mixed layer, as described herein.

In some embodiments, removal of hardened support material reveals a hardened mixed layer, comprising a hardened mixture of support material and modeling material formulation. Such a hardened mixture at a surface of an object may optionally have a relatively non-reflective appearance, also referred to herein as "matte"; whereas surfaces lacking such a hardened mixture (e.g., wherein support material formulation was not applied thereon) are described as "glossy" in comparison.

In some of any of the embodiments described herein, the method further comprises exposing the cured modeling material, either before or after removal of a support material, if such has been included in the building material, to a post-treatment condition. The post-treatment condition is typically aimed at further hardening the cured modeling material. In some embodiments, the post-treatment hardens a partially-cured material to thereby obtain a completely cured material.

In some embodiments, the post-treatment is effected by exposure to heat or radiation, as described in any of the respective embodiments herein. In some embodiments, when the condition is heat (thermal post-treatment), the post-treatment can be effected for a time period that ranges from a few minutes (e.g., 10 minutes) to a few hours (e.g., 1-24 hours).

In some embodiments, the thermal post-treatment comprises exposing the object to heat of at least 75° C. for at least 2 hours.

The Object:

The method of the present embodiments manufactures three-dimensional objects in a layerwise manner by forming a plurality of layers in a configured pattern corresponding to the shape of the objects, as described herein.

The final three-dimensional object, obtainable by a method as described herein, is made of the modeling material or a combination of modeling materials or a combination of modeling material/s and support material/s or modification thereof (e.g., following curing). All these operations are well-known to those skilled in the art of solid freeform fabrication.

In some embodiments, the object comprises a reinforcing material in one or more parts thereof.

In some embodiments, the object features, in at least a portion thereof, one or more of the following characteristics:

Tensile strength higher than 70 MPa; Tensile modulus higher than 1500 MPa, or higher than 1800 MPa, or higher than 2000 MPa, or higher than 3000 MPa;

Flexural strength higher than 90 MPa, or higher than 100 MPa;

Flexural modulus higher than 2500 MPa, or higher than 2800 MPa, or higher than 3000 MPa, or higher than 3500 MPa.

In some of these embodiments, these portions of the object feature HDT of at least 60° C.

In some embodiments, the parts of the object featuring one or more of the above-indicated properties are made of an acrylic material.

Herein throughout, an acrylic material is used to collectively describe material featuring one or more acrylate, methacrylate, acrylamide and/or methacrylamide group(s).

Similarly, an acrylic group is used to collectively describe curable groups which are acrylate, methacrylate, acrylamide and/or methacrylamide group(s), preferably acrylate or methacrylate groups (referred to herein also as (meth)acrylate groups).

It is expected that during the life of a patent maturing from this application many relevant features related to additive manufacturing will be developed and the scope of the term additive manufacturing and of embodiments thereof is intended to include all such new technologies a priori.

As used herein the term "about" refers to ±10% or ±5%.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

As used herein the term "method" refers to manners, means, techniques and procedures for accomplishing a given task including, but not limited to, those manners, means, techniques and procedures either known to, or readily developed from known manners, means, techniques and procedures by practitioners of the chemical, pharmacological, biological, biochemical and medical arts.

Herein throughout, the term "(meth)acrylic" encompasses acrylic and methacrylic compounds.

Herein throughout, the phrase "linking moiety" or "linking group" describes a group that connects two or more moieties or groups in a compound. A linking moiety is typically derived from a bi- or tri-functional compound, and can be regarded as a bi- or tri-radical moiety, which is connected to two or three other moieties, via two or three atoms thereof, respectively.

Exemplary linking moieties include a hydrocarbon moiety or chain, optionally interrupted by one or more heteroatoms, as defined herein, and/or any of the chemical groups listed below, when defined as linking groups.

When a chemical group is referred to herein as "end group" it is to be interpreted as a substituent, which is connected to another group via one atom thereof.

Herein throughout, the term "hydrocarbon" collectively describes a chemical group composed mainly of carbon and hydrogen atoms. A hydrocarbon can be comprised of alkyl, alkene, alkyne, aryl, and/or cycloalkyl, each can be substituted or unsubstituted, and can be interrupted by one or more heteroatoms. The number of carbon atoms can range from 2 to 20, and is preferably lower, e.g., from 1 to 10, or from 1 to 6, or from 1 to 4. A hydrocarbon can be a linking group or an end group.

Bisphenol A is an example of a hydrocarbon comprised of 2 aryl groups and one alkyl group.

As used herein, the term "amine" describes both a —NR'R" group and a —NR'— group, wherein R' and R" are each independently hydrogen, alkyl, cycloalkyl, aryl, as these terms are defined hereinbelow.

The amine group can therefore be a primary amine, where both R' and R" are hydrogen, a secondary amine, where R' is hydrogen and R" is alkyl, cycloalkyl or aryl, or a tertiary amine, where each of R' and R" is independently alkyl, cycloalkyl or aryl.

Alternatively, R' and R" can each independently be hydroxyalkyl, trihaloalkyl, cycloalkyl, alkenyl, alkynyl, aryl, heteroaryl, heteroalicyclic, amine, halide, sulfonate, sulfoxide, phosphonate, hydroxy, alkoxy, aryloxy, thiohydroxy, thioalkoxy, thioaryloxy, cyano, nitro, azo, sulfonamide, carbonyl, C-carboxylate, O-carboxylate, N-thiocarbamate, O-thiocarbamate, urea, thiourea, N-carbamate, O-carbamate, C-amide, N-amide, guanyl, guanidine and hydrazine.

The term "amine" is used herein to describe a —NR'R" group in cases where the amine is an end group, as defined hereinunder, and is used herein to describe a —NR'— group in cases where the amine is a linking group or is or part of a linking moiety.

The term "alkyl" describes a saturated aliphatic hydrocarbon including straight chain and branched chain groups. Preferably, the alkyl group has 1 to 30, or 1 to 20 carbon atoms. Whenever a numerical range; e.g., "1-20", is stated herein, it implies that the group, in this case the alkyl group, may contain 1 carbon atom, 2 carbon atoms, 3 carbon atoms, etc., up to and including 20 carbon atoms. The alkyl group may be substituted or unsubstituted. Substituted alkyl may have one or more substituents, whereby each substituent group can independently be, for example, hydroxyalkyl, trihaloalkyl, cycloalkyl, alkenyl, alkynyl, aryl, heteroaryl, heteroalicyclic, amine, halide, sulfonate, sulfoxide, phosphonate, hydroxy, alkoxy, aryloxy, thiohydroxy, thioalkoxy, thioaryloxy, cyano, nitro, azo, sulfonamide, C-carboxylate, O-carboxylate, N-thiocarbamate, O-thiocarbamate, urea, thiourea, N-carbamate, O-carbamate, C-amide, N-amide, guanyl, guanidine and hydrazine.

The alkyl group can be an end group, as this phrase is defined hereinabove, wherein it is attached to a single adjacent atom, or a linking group, as this phrase is defined hereinabove, which connects two or more moieties via at least two carbons in its chain. When the alkyl is a linking group, it is also referred to herein as "alkylene" or "alkylene chain".

Herein, a C(1-4) alkyl, substituted by a hydrophilic group, as defined herein, is included under the phrase "hydrophilic group" herein.

Alkene and alkyne, as used herein, are an alkyl, as defined herein, which contains one or more double bond or triple bond, respectively.

The term "cycloalkyl" describes an all-carbon monocyclic ring or fused rings (i.e., rings which share an adjacent pair of carbon atoms) group where one or more of the rings does not have a completely conjugated pi-electron system. Examples include, without limitation, cyclohexane, adamantine, norbornyl, isobornyl, and the like. The cycloalkyl group may be substituted or unsubstituted. Substituted cycloalkyl may have one or more substituents, whereby each substituent group can independently be, for example, hydroxyalkyl, trihaloalkyl, cycloalkyl, alkenyl, alkynyl, aryl, heteroaryl, heteroalicyclic, amine, halide, sulfonate, sulfoxide, phosphonate, hydroxy, alkoxy, aryloxy, thiohydroxy, thioalkoxy, thioaryloxy, cyano, nitro, azo, sulfonamide, C-carboxylate, O-carboxylate, N-thiocarbamate, O-thiocarbamate, urea, thiourea, N-carbamate, O-carbamate, C-amide, N-amide, guanyl, guanidine and hydrazine. The cycloalkyl group can be an end group, as this phrase is defined hereinabove, wherein it is attached to a single adjacent atom, or a linking group, as this phrase is defined hereinabove, connecting two or more moieties at two or more positions thereof.

Cycloalkyls of 1-6 carbon atoms, substituted by two or more hydrophilic groups, as defined herein, is included under the phrase "hydrophilic group" herein.

The term "heteroalicyclic" describes a monocyclic or fused ring group having in the ring(s) one or more atoms such as nitrogen, oxygen and sulfur. The rings may also have one or more double bonds. However, the rings do not have a completely conjugated pi-electron system. Representative examples are piperidine, piperazine, tetrahydrofurane, tetrahydropyrane, morpholino, oxalidine, and the like.

The heteroalicyclic may be substituted or unsubstituted. Substituted heteroalicyclic may have one or more substituents, whereby each substituent group can independently be, for example, hydroxyalkyl, trihaloalkyl, cycloalkyl, alkenyl, alkynyl, aryl, heteroaryl, heteroalicyclic, amine, halide, sulfonate, sulfoxide, phosphonate, hydroxy, alkoxy, aryloxy, thiohydroxy, thioalkoxy, thioaryloxy, cyano, nitro, azo, sulfonamide, C-carboxylate, O-carboxylate, N-thiocarbamate, O-thiocarbamate, urea, thiourea, O-carbamate, N-carbamate, C-amide, N-amide, guanyl, guanidine and hydrazine. The heteroalicyclic group can be an end group, as this phrase is defined hereinabove, where it is attached to a single adjacent atom, or a linking group, as this phrase is defined hereinabove, connecting two or more moieties at two or more positions thereof.

A heteroalicyclic group which includes one or more of electron-donating atoms such as nitrogen and oxygen, and in which a numeral ratio of carbon atoms to heteroatoms is 5:1 or lower, is included under the phrase "hydrophilic group" herein.

The term "aryl" describes an all-carbon monocyclic or fused-ring polycyclic (i.e., rings which share adjacent pairs of carbon atoms) groups having a completely conjugated pi-electron system. The aryl group may be substituted or unsubstituted. Substituted aryl may have one or more substituents, whereby each substituent group can independently be, for example, hydroxyalkyl, trihaloalkyl, cycloalkyl, alkenyl, alkynyl, aryl, heteroaryl, heteroalicyclic, amine, halide, sulfonate, sulfoxide, phosphonate, hydroxy, alkoxy, aryloxy, thiohydroxy, thioalkoxy, thioaryloxy, cyano, nitro, azo, sulfonamide, C-carboxylate, O-carboxylate, N-thiocarbamate, O-thiocarbamate, urea, thiourea, N-carbamate, O-carbamate, C-amide, N-amide, guanyl, guanidine and hydrazine. The aryl group can be an end group, as this term is defined hereinabove, wherein it is attached to a single adjacent atom, or a linking group, as this term is defined hereinabove, connecting two or more moieties at two or more positions thereof.

The term "heteroaryl" describes a monocyclic or fused ring (i.e., rings which share an adjacent pair of atoms) group having in the ring(s) one or more atoms, such as, for example, nitrogen, oxygen and sulfur and, in addition, having a completely conjugated pi-electron system. Examples, without limitation, of heteroaryl groups include pyrrole, furan, thiophene, imidazole, oxazole, thiazole, pyrazole, pyridine, pyrimidine, quinoline, isoquinoline and purine. The heteroaryl group may be substituted or unsubstituted. Substituted heteroaryl may have one or more substituents, whereby each substituent group can independently be, for example, hydroxyalkyl, trihaloalkyl, cycloalkyl, alkenyl, alkynyl, aryl, heteroaryl, heteroalicyclic, amine, halide, sulfonate, sulfoxide, phosphonate, hydroxy, alkoxy, aryloxy, thiohydroxy, thioalkoxy, thioaryloxy, cyano, nitro, azo, sulfonamide, C-carboxylate, O-carboxylate, N-thiocarbamate, O-thiocarbamate, urea, thiourea, O-carbamate, N-carbamate, C-amide, N-amide, guanyl, guanidine and hydrazine. The heteroaryl group can be an end group, as this phrase is defined hereinabove, where it is attached to a single adjacent atom, or a linking group, as this phrase is defined hereinabove, connecting two or more moieties at two or more positions thereof. Representative examples are pyridine, pyrrole, oxazole, indole, purine and the like.

The term "halide" and "halo" describes fluorine, chlorine, bromine or iodine. The term "haloalkyl" describes an alkyl group as defined above, further substituted by one or more halide.

The term "sulfate" describes a —O—S(=O)$_2$—OR' end group, as this term is defined hereinabove, or an —O—S(=O)$_2$—O— linking group, as these phrases are defined hereinabove, where R' is as defined hereinabove.

The term "thiosulfate" describes a —O—S(=S)(=O)—OR' end group or a —O—S(=S)(=O)—O— linking group, as these phrases are defined hereinabove, where R' is as defined hereinabove.

The term "sulfite" describes an —O—S(=O)—O— R' end group or a —O—S(=O)—O— group linking group, as these phrases are defined hereinabove, where R' is as defined hereinabove.

The term "thiosulfite" describes a —O—S(=S)—O— R' end group or an —O—S(=S)—O— group linking group, as these phrases are defined hereinabove, where R' is as defined hereinabove.

The term "sulfinate" describes a —S(=O)—OR' end group or an —S(=O)—O— group linking group, as these phrases are defined hereinabove, where R' is as defined hereinabove.

The term "sulfoxide" or "sulfinyl" describes a —S(=O) R' end group or an —S(=O)— linking group, as these phrases are defined hereinabove, where R' is as defined hereinabove.

The term "sulfonate" describes a —S(=O)$_2$—R' end group or an —S(=O)$_2$— linking group, as these phrases are defined hereinabove, where R' is as defined herein.

The term "S-sulfonamide" describes a —S(=O)$_2$—NR'R" end group or a —S(=O)$_2$—NR'— linking group, as these phrases are defined hereinabove, with R' and R" as defined herein.

The term "N-sulfonamide" describes an R'S(=O)$_2$—NR"— end group or a —S(=O)$_2$—NR'— linking group, as these phrases are defined hereinabove, where R' and R" are as defined herein.

The term "disulfide" refers to a —S—SR' end group or a —S—S— linking group, as these phrases are defined hereinabove, where R' is as defined herein.

The term "phosphonate" describes a —P(=O)(OR')(OR") end group or a —P(=O)(OR')(O)— linking group, as these phrases are defined hereinabove, with R' and R" as defined herein.

The term "thiophosphonate" describes a —P(=S)(OR')(OR") end group or a —P(=S)(OR')(O)— linking group, as these phrases are defined hereinabove, with R' and R" as defined herein.

The term "phosphinyl" describes a —PR'R" end group or a —PR'— linking group, as these phrases are defined hereinabove, with R' and R" as defined hereinabove.

The term "phosphine oxide" describes a —P(=O)(R')(R") end group or a —P(=O)(R')— linking group, as these phrases are defined hereinabove, with R' and R" as defined herein.

The term "phosphine sulfide" describes a —P(=S)(R')(R") end group or a —P(=S)(R')— linking group, as these phrases are defined hereinabove, with R' and R" as defined herein.

The term "phosphite" describes an —O—PR'(=O)(OR") end group or an —O—PH(=O)(O)— linking group, as these phrases are defined hereinabove, with R' and R" as defined herein.

The term "carbonyl" or "carbonate" as used herein, describes a —C(=O)—R' end group or a —C(=O)— linking group, as these phrases are defined hereinabove, with R' as defined herein.

The term "thiocarbonyl" as used herein, describes a —C(=S)—R' end group or a —C(=S)-linking group, as these phrases are defined hereinabove, with R' as defined herein.

The term "oxo" as used herein, describes a (=O) group, wherein an oxygen atom is linked by a double bond to the atom (e.g., carbon atom) at the indicated position.

The term "thiooxo" as used herein, describes a (=S) group, wherein a sulfur atom is linked by a double bond to the atom (e.g., carbon atom) at the indicated position.

The term "oxime" describes a=N—OH end group or a=N—O— linking group, as these phrases are defined hereinabove.

The term "hydroxyl" describes a —OH group.

The term "alkoxy" describes both an —O-alkyl and an —O-cycloalkyl group, as defined herein.

The term "aryloxy" describes both an —O-aryl and an —O-heteroaryl group, as defined herein.

The term "thiohydroxy" describes a —SH group.

The term "thioalkoxy" describes both a —S-alkyl group, and a —S-cycloalkyl group, as defined herein.

The term "thioaryloxy" describes both a —S-aryl and a —S-heteroaryl group, as defined herein.

The "hydroxyalkyl" is also referred to herein as "alcohol", and describes an alkyl, as defined herein, substituted by a hydroxy group.

The term "cyano" describes a —C≡N group.

The term "isocyanate" describes an —N=C=O group.

The term "isothiocyanate" describes an —N=C=S group.

The term "nitro" describes an —NO$_2$ group.

The term "acyl halide" describes a —(C=O)R'''' group wherein R'''' is halide, as defined hereinabove.

The term "azo" or "diazo" describes an —N=NR' end group or an —N=N— linking group, as these phrases are defined hereinabove, with R' as defined hereinabove.

The term "peroxo" describes an —O—OR' end group or an —O—O— linking group, as these phrases are defined hereinabove, with R' as defined hereinabove.

The term "carboxylate" as used herein encompasses C-carboxylate and O-carboxylate.

The term "C-carboxylate" describes a —C(=O)—OR' end group or a —C(=O)—O— linking group, as these phrases are defined hereinabove, where R' is as defined herein.

The term "O-carboxylate" describes a —OC(=O)R' end group or a —OC(=O)— linking group, as these phrases are defined hereinabove, where R' is as defined herein.

A carboxylate can be linear or cyclic. When cyclic, R' and the carbon atom are linked together to form a ring, in C-carboxylate, and this group is also referred to as lactone. Alternatively, R' and O are linked together to form a ring in O-carboxylate. Cyclic carboxylates can function as a linking group, for example, when an atom in the formed ring is linked to another group.

The term "thiocarboxylate" as used herein encompasses C-thiocarboxylate and O-thiocarboxylate.

The term "C-thiocarboxylate" describes a —C(=S)—OR' end group or a —C(=S)—O— linking group, as these phrases are defined hereinabove, where R' is as defined herein.

The term "O-thiocarboxylate" describes a —OC(=S)R' end group or a —OC(=S)— linking group, as these phrases are defined hereinabove, where R' is as defined herein.

A thiocarboxylate can be linear or cyclic. When cyclic, R' and the carbon atom are linked together to form a ring, in C-thiocarboxylate, and this group is also referred to as thiolactone. Alternatively, R' and O are linked together to form a ring in O-thiocarboxylate. Cyclic thiocarboxylates can function as a linking group, for example, when an atom in the formed ring is linked to another group.

The term "carbamate" as used herein encompasses N-carbamate and O-carbamate.

The term "N-carbamate" describes an R''OC(=O)—NR'— end group or a —OC(=O)—NR'— linking group, as these phrases are defined hereinabove, with R' and R'' as defined herein.

The term "O-carbamate" describes an —OC(=O)—NR'R'' end group or an —OC(=O)—NR'— linking group, as these phrases are defined hereinabove, with R' and R'' as defined herein.

A carbamate can be linear or cyclic. When cyclic, R' and the carbon atom are linked together to form a ring, in O-carbamate. Alternatively, R' and O are linked together to form a ring in N-carbamate. Cyclic carbamates can function as a linking group, for example, when an atom in the formed ring is linked to another group.

The term "carbamate" as used herein encompasses N-carbamate and O-carbamate.

The term "thiocarbamate" as used herein encompasses N-thiocarbamate and O-thiocarbamate.

The term "O-thiocarbamate" describes a —OC(=S)—NR'R'' end group or a —OC(=S)—NR'— linking group, as these phrases are defined hereinabove, with R' and R'' as defined herein.

The term "N-thiocarbamate" describes an R''OC(=S)NR'— end group or a —OC(=S)NR'-linking group, as these phrases are defined hereinabove, with R' and R'' as defined herein.

Thiocarbamates can be linear or cyclic, as described herein for carbamates.

The term "dithiocarbamate" as used herein encompasses S-dithiocarbamate and N-dithiocarbamate.

The term "S-dithiocarbamate" describes a —S C(=S)—NR'R'' end group or a —SC(=S)NR'— linking group, as these phrases are defined hereinabove, with R' and R'' as defined herein.

The term "N-dithiocarbamate" describes an R''SC(=S)NR'— end group or a —SC(=S)NR'-linking group, as these phrases are defined hereinabove, with R' and R'' as defined herein.

The term "urea", which is also referred to herein as "ureido", describes a —NR'C(=O)—NR''R''' end group or a —NR'C(=O)—NR''— linking group, as these phrases are defined hereinabove, where R' and R'' are as defined herein and R''' is as defined herein for R' and R''.

The term "thiourea", which is also referred to herein as "thioureido", describes a —NR'—C(=S)—NR''R''' end group or a —NR'—C(=S)—NR''— linking group, with R', R'' and R''' as defined herein.

The term "amide" as used herein encompasses C-amide and N-amide.

The term "C-amide" describes a —C(=O)—NR'R'' end group or a —C(=O)—NR'— linking group, as these phrases are defined hereinabove, where R' and R'' are as defined herein.

The term "N-amide" describes a R'C(=O)—NR''— end group or a R'C(=O)—N— linking group, as these phrases are defined hereinabove, where R' and R'' are as defined herein.

An amide can be linear or cyclic. When cyclic, R' and the carbon atom are linked together to form a ring, in C-amide, and this group is also referred to as lactam. Cyclic amides can function as a linking group, for example, when an atom in the formed ring is linked to another group.

The term "guanyl" describes a R'R''NC(=N)— end group or a —R'NC(=N)— linking group, as these phrases are defined hereinabove, where R' and R'' are as defined herein.

The term "guanidine" describes a —R'NC(═N)—NR"R'" end group or a —R'NC(═N)—NR"— linking group, as these phrases are defined hereinabove, where R', R" and R'" are as defined herein.

The term "hydrazine" describes a —NR'—NR"R'" end group or a —NR'—NR"— linking group, as these phrases are defined hereinabove, with R', R", and R'" as defined herein.

As used herein, the term "hydrazide" describes a —C(═O)—NR'—NR"R'" end group or a —C(═O)—NR'—NR"— linking group, as these phrases are defined hereinabove, where R', R" and R'" are as defined herein.

As used herein, the term "thiohydrazide" describes a —C(═S)—NR'—NR"R'" end group or a —C(═S)—NR'—NR"— linking group, as these phrases are defined hereinabove, where R', R" and R'" are as defined herein.

As used herein, the term "alkylene glycol" describes a —O—[(CR'R")$_z$—O]$_y$R'" end group or a —O—[(CR'R")$_z$—O]$_y$ linking group, with R', R" and R'" being as defined herein, and with z being an integer of from 1 to 10, preferably, from 2 to 6, more preferably 2 or 3, and y being an integer of 1 or more. Preferably R' and R" are both hydrogen. When z is 2 and y is 1, this group is ethylene glycol. When z is 3 and y is 1, this group is propylene glycol. When y is 2-4, the alkylene glycol is referred to herein as oligo(alkylene glycol).

When y is greater than 4, the alkylene glycol is referred to herein as poly(alkylene glycol). In some embodiments of the present invention, a poly(alkylene glycol) group or moiety can have from 10 to 200 repeating alkylene glycol units, such that z is 10 to 200, preferably 10-100, more preferably 10-50.

The term "silanol" describes a —Si(OH)R'R" group, or —Si(OH)$_2$R' group or —Si(OH)$_3$ group, with R' and R" as described herein.

The term "silyl" describes a —SiR'R"R'" group, with R', R" and R'" as described herein.

As used herein, the term "urethane" or "urethane moiety" or "urethane group" describes a Rx-O—C(═O)—NR'R" end group or a —Rx-O—C(═O)—NR'— linking group, with R' and R" being as defined herein, and Rx being an alkyl, cycloalkyl, aryl, alkylene glycol or any combination thereof. Preferably R' and R" are both hydrogen.

The term "polyurethane" or "oligourethane" describes a moiety that comprises at least one urethane group as described herein in the repeating backbone units thereof, or at least one urethane bond, —O—C(═O)—NR'—, in the repeating backbone units thereof.

Herein throughout, whenever the phrase "weight percents", or "% by weight" or "% wt.", is indicated in the context of embodiments of a formulation (e.g., a modeling formulation), it is meant weight percents of the total weight of the respective uncured formulation.

The term "branching unit" as used herein describes a multi-radical, preferably aliphatic or alicyclic group. By "multi-radical" it is meant that the unit has two or more attachment points such that it links between two or more atoms and/or groups or moieties.

In some embodiments, the branching unit is derived from a chemical moiety that has two, three or more functional groups. In some embodiments, the branching unit is a branched alkyl or is a cycloalkyl (alicyclic) as defined herein.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

EXAMPLES

Reference is now made to the following examples, which together with the above descriptions illustrate some embodiments of the invention in a non-limiting fashion.

Example 1 (Reference Example)

Pastes comprising an acrylic formulation containing 20 weight % silica powder were prepared using a different milling technique of the silica powder in each paste.

Effect of the milling technique on the rheological behavior of the formulations was tested. AEROSIL® R7200, a methacrylate-functionalized fumed silica, was used as the silica powder before milling. The silica powder was mixed with ethoxylated (4) Bisphenol A dimethacrylate (SR540) and the mixture as obtained was subjected to milling.

The effect of ball milling, milling using rotor stator and plate mixing, and of a simple pre-mixing as a reference, on the rheological properties of the obtained formulation is shown in FIG. 7. As can be seen, different mixing types result in different dispersions which in turn result in different rheological behaviors, indicating that such pastes may be less suitable for providing reinforced 3D-printed materials. A rapid decrease of the viscosity was observed when ball milling was applied, indicating a good dispersion and distribution of the silica particles in the acrylic material.

Example 2 (Reference Example)

The use of a commercially available curable formulation containing 50% by weight silica nanoparticles in Hexanediol diacrylate (HDDA), marketed as Nanobyk 3605, NANOCRYL® C 153-10, was studied. Various formulations, containing 15, 35 or 50% by weight of Nanobyk 3605 (7.5, 17.5 and 25% by weight SiO$_2$, respectively, and same amount of HDDA), 15-40% by weight of a monofunctional acrylate (isobornyl acrylate; IBOA and/or acryloyl morpholine; ACMO), 15-25% by weight of a di-functional aliphatic urethane oligomer diacrylate (e.g., those marketed by Sartomer under the trade names CN981, CN991, CN980), 1-20% by weight of di-functional or multi-functional acrylate (e.g., those marketed by Sartomer under the trade names SR833s; SR399, SR508, SR595, SR355), and a photoinitator system (e.g., a mixture of I184 and TPO), 1-3%, by weight, were prepared and the properties of mold preparations obtained upon exposing the formulations to UV curing in a UV oven for 24 hours was tested.

Exemplary such formulations are presented in Tables 1 and 2 below. FIGS. 8 and 9 present the storage modulus obtained for hardened materials formed in mold upon exposing the formulations presented in Tables 1 and 2, respectively, to UV-curing.

TABLE 1

| Component | HDDA1 (% weight) | HDDA14 (% weight) | HDDA15 (% weight) |
|---|---|---|---|
| BYK 3605 | 50 (25 HDDA; 25 SiO$_2$) | 15 (7.5 HDDA; 7.5 SiO$_2$) | 35 (17.5 HDDA; 17.5 SiO$_2$) |
| Additional HDDA | 00 (Total = 25) | 35 (Total = 42.5) | 15 (Total = 32.5) |
| Monofunctional acrylate | 15 | 15 | 15 |
| Aliphatic urethane oligomer diacrylate | 20 | 20 | 20 |
| di-functional acrylate | 15 | 15 | 15 |

TABLE 2

| Component | HDDA11 (% weight) | HDDA12 (% weight) | HDDA13 (% weight) | HDDA17 (% weight) |
|---|---|---|---|---|
| BYK 3605 | 50 (25 HDDA; 25 SiO$_2$) | 35 (17.5 HDDA; 17.5 SiO$_2$) | 0 | 50 (25 HDDA; 25 SiO$_2$) |
| Additional HDDA | 0 (Total = 25) | 0 (Total = 17.5) | 35 (Total = 35) | 0 (Total = 25) |
| Monofunctional acrylate | 20 | 30 | 30 | 15 |
| Aliphatic urethane oligomer diacrylate | 15 | 15 | 15 | 20 |
| Multi-functional acrylate (e.g., pentafunctional) | 15 | 20 | 20 | 15 |

From the data shown in FIGS. 8 and 9, it appears that formulations containing less than 10% silica nanoparticles (e.g., HDDA14) exhibit a lower storage modulus than those containing 17.5% and 25% silica nanoparticles. Furthermore, it appears that formulations containing at least 25% silica nanoparticles (e.g., HDDA11 and HDDA17) exhibit a lower storage modulus than those containing 17.5% silica nanoparticles (e.g., HDDA12; see FIG. 9). However, formulations such as those presented in Tables 1 and 2 exhibited a viscosity at 75° C. which is higher than 35 centipoises and were therefore deemed more challenging for jetting with commonly used printing head of 3D inkjet printing systems.

Reducing the viscosity by lowering the degree of cross-linking (e.g., by changing the weight ratio of monofunctional acrylates to multifunctional acrylate and/or using multi-functional acrylates featuring a lower number of curable groups) provided formulations exhibiting a suitable viscosity, in a range of 10-30 centipoises at 75° C. Such formulations contained, for example, 20-40% by weight BYK 3605; 30-40% by weight monofunctional acrylate featuring a molecular weight lower than 300 gram/mol, which is either IBOA or a mixture of IBOA and ACMO; 15-20% by weight, mono-functional or di-functional oligomeric aliphatic acrylates (e.g., urethane acrylates); and 15-20% by weight multifunctional acrylates (e.g., di-, tetra- or penta-branched aliphatic acrylates). All formulations which exhibited a viscosity suitable for inkjet printing featured, when hardened, high curling, and hence printability was considered limited without applying further curling compensation methodologies (e.g. heated tray, heated environment, anchoring structures).

The data obtained in these studies has prompted the present inventors to look for alternative silica-containing formulations that would better suit current process requirements.

Example 3

In order to overcome the brittleness, high viscosity and/or high curling exhibited with HDDA-containing formulations, formulations containing a dispersion of 50% by weight silica nanoparticles in ethoxylated trimethylol propane triacrylate (TMPEOTA), marketed e.g. as NANOCRYL® C 153, Laromer® PO 9026 N, were tested.

Generally, the dispersion was combined with ethoxylated multifunctional curable materials (at about 10-30% by weight), so as to reduce brittleness, to thereby provide a total concentration of ethoxylated multifunctional curable materials of about 20-60% and a total concentration of silica nanoparticles of about 10-30% by weight. The formulation may further include a first monofunctional curable material (e.g., ACMO), at about 10-50% by weight, a second monofunctional curable material at about 10-30% by weight, photoinitiators (e.g., a mixture of 4:1 Irgacure 184:Irgacure TPO), at about 1-5% by weight in total, and additives (e.g. inhibitors, pigment, surface tension agent(s)).

Table 3 below presents the composition of an exemplary such formulation and the mechanical properties of the formulation when hardened, compared to a reference formulation which includes the same materials in the same amounts but is devoid of the silica nanoparticles.

TABLE 3

| Components | Reference formulation (% wt.) | SiO2-containing formulation (% wt.) |
|---|---|---|
| Laromer 9026 (50% silica nanoparticles in ethoxylated aliphatic triacrylate) | 0.0 | 30-40 |
| Ethoxylated aliphatic triacrylate | 30-40 | 0.0 |
| Ethoxylated aromatic diacrylate | 15-25 | 15-25 |
| Monofunctional acrylate | 25-35 | 25-35 |
| Oligomeric aromatic monofunctional acrylate | 10-20 | 10-20 |
| PI (total amount) | 2-3.5 | 2-3.5 |
| PROPERTIES | | |
| Tg (DMA loss modulus) | 93.6 | 82.6 |
| Viscosity (Brookfield; at 75° C.) | 8.2 | 13.3 |
| Storage modulus @ 50° C. (MPa) | 1875 | 2250 |
| Izod impact notched (J/m) | N/A | 19 |
| Tensile Strength (MPa) | 63.8 | 73.6 (4.8) |
| Elongation at break (%) | 8.5 | 5.9 (0.6) |
| Tensile Modulus (MPa) | 1832 | 2181 (107) |
| HDT (° C.) | 63 | 75 |

FIG. 10 presents the mechanical properties of the formulations presented in Table 3 and show the improvement achieved by the silica-containing formulation.

Additional exemplary formulations, containing varying concentrations of silica nanoparticles, were tested. Table 4 below presents the chemical composition of the tested formulations and the rheological and physico-mechanical properties thereof. Formulations containing 5 and 10% by weight silica particles were obtained using both Laromer 9026 (containing 50% by weight silica particles in ethoxylated aliphatic triacrylate) and Laromer 8863 (containing 35% by weight silica particles in the same ethoxylated aliphatic triacrylate), at the appropriate amounts.

TABLE 4

| Component | 17% SiO$_2$ | 5% SiO$_2$ | 10% SiO$_2$ | 25% SiO$_2$ |
|---|---|---|---|---|
| Laromer 9026 (50% SiO$_2$) | 33.7 | 9.6 | 19.2 | 48.1 |
| Laromer 8863 (35% SiO$_2$) | 0.0 | 24.0 | 14.4 | 0.0 |
| Ethoxylated aromatic diacrylate | 15-25 | 15-25 | 15-25 | 10-20 |
| Monofunctional acrylate | 25-35 | 25-35 | 25-35 | 25-35 |
| Oligomeric aromatic monofunctional acrylate | 10-20 | 10-20 | 10-20 | 5-15 |
| PI (total amount) | 3-5 | 3-5 | 3-5 | 3-5 |
| Surface Active agent | 0.1-1 | 0.1-1 | 0.1-1 | 0.1-1 |
| Inhibitor | 0.01-1 | 0.01-1 | 0.01-1 | 0.01-1 |
| PROPERTIES | | | | |
| Printability | jettable | Non jettable due to low viscosity | Non jettable due to low viscosity | Non jettable due to non-Newtonian behavior |
| Storage modulus @ 50° C. (MPa) | about 2350 | about 1500 | about 1850 | about 2350 |
| Tg (peak loss modulus) | 86.9° C. | 83.9° C. | 84.8° C. | 81.2° C. |

FIG. 11 presents the Loss Modulus and Storage Modulus of each of the tested formulations. As shown therein, a formulation containing 17% SiO$_2$ nanoparticles exhibited similar, if not improved, mechanical-thermal properties compared with a formulation containing higher % SiO$_2$, with no change in Tg, and exhibited improved properties compared to formulations containing 10% or 5% SiO$_2$ nanoparticles.

FIG. 12 presents the data obtained for these formulations in rheological tests and shows that, for formulations according to these embodiments, a formulation containing high % SiO$_2$ exhibits a strong shear thinning effect while a formulation containing 17% SiO$_2$ exhibits a Newtonian fluid behavior which is highly desirable for 3D inkjet printing. Formulations containing 10% or 5% SiO$_2$ exhibited a very low viscosity which renders these formulations non-jettable.

Table 5 below presents the mechanical properties obtained for a printed object ("Dog bone" according to ASTM D638-03) formed of an exemplary formulation containing 17% SiO$_2$ silica nanoparticles, 17% ethoxylated aliphatic triacrylate, about 19-20% ethoxylated aromatic diacrylate, about 25-30% of a hydrophilic monofunctional acrylate, about 14-15% aromatic acrylate, a surface active agent (0.1-1%) and a mixture of two photoinitiators at a total concentration of about 3.5-4%, referred to as INV1, compared with formulations containing HDDA instead of the ethoxylated triacrylate, referred to as REF HDDA1 and REF HDDA2. Each of the reference formulations contained 17% SiO$_2$ silica nanoparticles, 17% HDDA instead of the ethoxylated triacrylate, 15-25% aliphatic tetraacrylate instead of the ethoxylated aromatic diacrylate, 25-30% of a 50:50 mixture of a hydrophilic and a hydrophobic monofunctional acrylate (instead of only a hydrophilic monofunctional acrylate), a mixture of two photoinitiators at a total concentration of about 3-5, and 10-20% aliphatic urethane acrylates, with a different type in each of the reference formulations.

TABLE 5

| Component | INV1 (17% SiO₂) | REF HDDA1 (17% SiO₂) | REF HDDA2 (17% SiO₂) |
|---|---|---|---|
| Laromer 9026 (50% SiO₂) | 33.5 | 0.0 | 0.0 |
| BYK 3605 (HDDA) | 0.0 | 34 | 34 |
| Ethoxylated aromatic diacrylate | 15-25 | 0.0 | 0.0 |
| Aliphatic tetraacrylate | 0.0 | 15-25 | 15-25 |
| Hydrophilic monofunctional acrylate | 25-30 | 25-30 | 10-20 |
| Hydrophobic monofunctional acrylate | 0.0 | 10-20 | 10-20 |
| Aromatic monoacrylate | 10-20 | 0.0 | 0.0 |
| Aliphatic urethane monoacrylate Type 1 | 0.0 | 10-20 | 0.0 |
| Aliphatic urethane monoacrylate Type 2 | 0.0 | 0.0 | 10-20 |
| PI (total amount) | 3-6 | 3-5 | 3-5 |
| PROPERTIES | | | |
| Viscosity @75 C. (cp) | 12.7 | 37.5 | 12.24 |
| HDT (post-cure) (C) | 82 | 65 | High curling (not printable) |
| Tensile Strength (MPa) | 81.2 | N/A | |
| Elongation at break (%) | 8.9 | N/A | |
| Tensile modulus (MPa) | 2208 | N/A | |
| Flexural strength (MPa) | 99 | 49.7 | |
| Flexural Modulus (MPa) | 3136 | 1441 | |

In a search for further modifications for optimizing the silica-containing formulation, ethoxylated diacrylates featuring, when hardened, stiffer materials, were tested. Ethoxylated diacrylates generally feature soft, rubbery portion(s), imparted by the alkylene glycol groups, and more rigid portion(s), imparted by a hydrocarbon group (e.g., bisphenol A). Stiffer materials can be obtained while using ethoxylated diacrylates that feature smaller rubbery portions (e.g., shorter alkylene glycol chain(s)). An exemplary modification of such a curable material is presented in the below scheme:

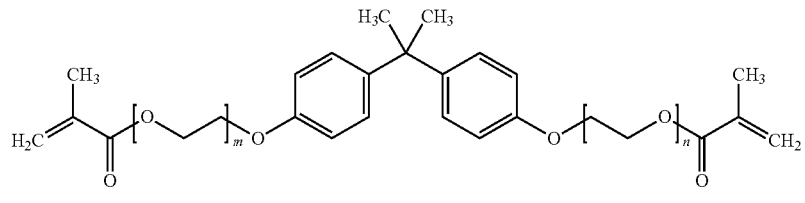

m + n = 4 -> m + n = 2

Table 6 below presents the properties of an object printed using a digitalmode (DM) as described above with the further modified, "stiff" formulation, referred to as INV2, compared to the object obtained using a silica-containing formulation as shown in Table 5 above and referred to as INV1.

TABLE 6

| Component | INV1 (% wt.) | INV2 (% wt.) |
|---|---|---|
| Laromer 9026 (50% SiO₂) | 33.5 | 33.5 |
| Ethoxylated (4) aromatic diacrylate | 15-25 | 0.0 |
| Ethoxylated (2) aromatic diacrylate | 0.0 | 15-25 |
| Monofunctional acrylate | 25-30 | 25-30 |
| Oligomeric aromatic monofunctional acrylate | 10-20 | 10-20 |
| PI (total amount) | 3-5 | 3-5 |
| Surface Active agent | 0.5 | 0.5 |
| Inhibitor | 0.1 | 0.1 |
| PROPERTIES | | |
| Izod impact notched (J/m) | 18 | 19 |
| HDT (post-cure*) (° C.) | 82 | 105 |
| Tensile Strength (MPa) | 81.2 | 85.3 |
| Elongation at break (%) | 8.9 | 5.4 |
| Tensile modulus (MPa) | 2208 | 2415 |
| Flexural strength (MPa) | 99 | 143 |
| Flexural Modulus (MPa) | 3136 | 4300 |

*Post curing was performed by subjecting the printed object to heating at 75° C. for 2 hours.

As can be seen, the mechanical strength of the obtained object was improved upon using the "stiffer" ethoxylated multifunctional acrylate.

Example 4

A 17% silica-containing formulation according to the present embodiments was tested also when printed in a digital mode (DM) with an acrylic coating and an intermediate mixed layer (stitch layer), according to some of the embodiments described in WO2018/055521. More specifically, an object was printed with a 1-pixel coat layer made of RGD515, and 1 pixel of a stitch layer made of 50:50 RGD515 and the silica-containing formulation, as exemplified in FIG. 6. Table 7 below presents the mechanical properties of the printed object obtained with the formulations referred to herein as INV1 (referred to herein as 17% $SiO_2$ DM or INV1-DM) and INV2 (referred to herein as 17% $SiO_2$-stiff-DM or INV2-DM), compared with the mechanical properties of a similar object, made as described in WO2018/055521, referred to as D-ABS.

TABLE 7

| Property | 17% SiO2 DM (INV1-DM) | 17% $SiO_2$-Stiff-DM (INV2-DM) | D-ABS |
| --- | --- | --- | --- |
| Izod impact (printed notch) (J/m) | 125 | 68 | 90-115 |
| Tensile Strength (MPa) | 73 | 78 | 50 |
| Elongation at break (%) | 14 | 12 | 26 |
| Tensile Modulus (MPa) | 2040 | 2173 | 1367 |
| Flexural strength (MPa) | 99 | 113 | 93 |
| Flexural Modulus (MPa) | 3160 | 3450 | 2640 |
| HDT (° C.) after Post cure at 75° C. for 2 hours) | 75 | 78 | 98 |

As can be seen, a substantial increase in the mechanical properties was observed compared to those obtained with D-ABS, with a minor decrease in the thermal stability (HDT). No substantial curling was observed.

FIG. 13 presents the strain-stress curves obtained for an object printed with D-ABS, 17% $SiO_2$-DM and 17% $SiO_2$-stiff-DM.

Example 5

Comparative Presentation

Table 8 below summarizes the findings of the studies described hereinabove.

TABLE 8

| Property | Method | INV1 | INV1-DM | REF No $SiO_2$ (mold) | REF Vero | REF DABS | REF Agilus |
| --- | --- | --- | --- | --- | --- | --- | --- |
| HDT (post-cure*; ° C.) | ASTM D648 | 82 | 75 | 63 | 45-50 | 51-55 | N/A |
| Tensile Strength (MPa) | ASTM D638 | 81.2 | 73 | 63.8 | 50-65 | 55-60 | 2.4-3.1 |
| Elongation at break (%) | ASTM D638 | 8.9 | 14 | 8.5 | 10-25 | 25-40 | 220-270 |
| Tensile modulus (MPa) | ASTM D638 | 2208 | 2040 | 1832 | 2000-3000 | 2600-3300 | N/A |
| Flexural strength (MPa) | ASTM D790 | 99 | 99 | 115 | 75-110 | 65-75 | N/A |
| Flexural Modulus (MPa) | ASTM D790 | 3136 | 3160 | 3300 | 2200-3200 | 1700-2200 | N/A |

As can be seen in Table 8, objects made while using formulations as described herein feature improved physico-mechanical properties such as HDT, Impact resistance, Tensile strength, flexural strength and flexural modulus, when compared to the same formulation without the silica particles, and, importantly, when compared to other acrylic-based formulations that are currently used for providing high mechanical strength.

Example 6

Additional studies were performed while using a pre-dispersion of the silica in a different multi-functional curable material, preferably a diacrylate having an aliphatic, optionally heteroalicyclic, hydrocarbon moiety linking the curable groups.

An exemplary such material has as the hydrocarbon moiety a heteroalicyclic moiety such as tricyclododecane dimethanol diacrylate (e.g. TCCDA, marketed as S833 NS, by Sartomer).

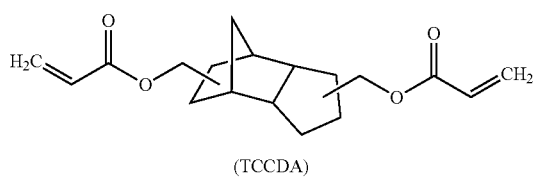

(TCCDA)

The chemical compositions of exemplary formulations according to these embodiments and the properties of objects made therefrom are present in Table 9 below.

TABLE 9

| Component | INV3 (% wt.) | INV3-DM (% wt.) | INV4 (% wt.) | INV4-DM (% wt.) | Vero (REF) |
|---|---|---|---|---|---|
| SR833NS:Silica (50:50) | 33.5 | 33.5 | 33.5 | 33.5 | |
| Ethoxylated (4) aromatic diacrylate | 15-25 | 15-25 | 0.0 | 0.0 | |
| Ethoxylated (2) aromatic diacrylate | 0.0 | 0.0 | 15-25 | 15-25 | |
| Monofunctional acrylate | 25-30 | 25-30 | 25-30 | 25-30 | |
| Oligomeric aromatic monofunctional acrylate | 10-20 | 10-20 | 10-20 | 10-20 | |
| PI (total amount) | 3-5 | 3-5 | 3-5 | 3-5 | |
| Surface Active agent | 0.1-1 | 0.1-1 | 0.1-1 | 0.1-1 | |
| Inhibitor | 0.01-1 | 0.01-1 | 0.01-1 | 0.01-1 | |
| Coating (e.g., RGD515) | No | Yes | No | Yes | |
| PROPERTIES | | | | | |
| Tensile Strength (MPa) | 85.2 | 72.6 | 87 | 83.5 | 50-65 |
| Elongation at break (%) | 5.2 | 7.9 | 3.4 | 8.2 | 10-25 |
| Tensile Modulus (MPa) | 3905 | 3295 | 4284 | 3736 | 2000-3000 |

As can be seen, a substantial increase in the mechanical properties was observed compared to those obtained with the Vero Reference formulation, with a minor decrease in the thermal stability (HDT). No substantial curling was observed.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

In addition, any priority document(s) of this application is/are hereby incorporated herein by reference in its/their entirety.

What is claimed is:

1. A formulation usable in additive manufacturing of a three-dimensional object, the formulation comprising:
   silica particles, in an amount of from 15 to 20%, by weight;
   a first multi-functional curable material in an amount of from 10 to 30%, or from 15 to 20%, by weight, said first multi-functional curable material having a molecular weight of from 300 gram/mol to 1,000 gram/mol;
   a second multi-functional curable material in an amount of from 10 to 30%, by weight, said second multi-functional curable material having a molecular weight lower than 1,000 gram/mol; and
   a monofunctional curable material having a molecular weight of no more than 300 gram/mol, in an amount of from 10 to 50% by weight,
   wherein:
   said first multi-functional curable material is an ethoxylated tri-functional curable material which comprises at least 3 alkylene glycol groups and a linear aliphatic branching unit or is a di-functional curable material that comprises an alicyclic branching unit;
   said second multi-functional curable material is an ethoxylated di-functional curable material which comprises from 2 to 6 alkylene glycol units, an aromatic branching unit and at least one methacrylic curable group; and
   said monofunctional curable material is hydrophilic.

2. The formulation of claim 1, wherein an average size of said silica nanoparticles is in a range of from 20 to 100 nm.

3. The formulation of claim 1, wherein at least a portion, or all, of said silica particles comprise silica particles functionalized by curable functional groups.

4. The formulation of claim 1, wherein said first multi-functional curable material is said ethoxylated tri-functional curable material which comprises at least 3 alkylene glycol groups and a linear aliphatic branching unit.

5. The formulation of claim 1, wherein said first multi-functional material comprises said di-functional curable material that comprises an alicyclic branching unit.

6. The formulation of claim 1, wherein said second multi-functional curable material comprises a methacrylic curable group.

7. The formulation of claim 1, further comprising an additional monofunctional curable material, in an amount of from 10 to 20% by weight, said additional curable material having a molecular weight of no more than 500 gram/mol.

8. The formulation of claim 7, comprising:
   from about 20 to about 60% by weight of a dispersion comprising said silica particles pre-dispersed in said first multi-functional curable material;
   from about 10 to about 30% by weight of said second multi-functional curable material;

from about 20 to about 50% by weight of said monofunctional curable material; and from about 10 to about 30% by weight of said additional curable material.

9. The formulation of claim 8, wherein:

said first multi-functional curable material is said tri-functional ethoxylated curable material comprising 3 acrylate groups, at least three alkylene glycol groups and an aliphatic branching unit;

said second multi-functional curable material is said di-functional ethoxylated curable material comprising two methacrylate groups and an aromatic branching unit; and said monofunctional curable material is a hydrophilic monoacrylate.

10. The formulation of claim 5, wherein:

said first multi-functional curable material is said di-functional curable material comprising an alicyclic branching unit;

said second multi-functional curable material is said di-functional ethoxylated curable material comprising an aromatic branching unit; and said monofunctional curable material is a hydrophilic monoacrylate.

11. A multi-formulation system comprising at least two formulations, at least one of said formulations is a first formulation which is the formulation of claim 1, and at least one another formulation is a second formulation which differs from said first formulation by at least one of HDT, Izod Impact and elastic moduli.

12. A method of additive manufacturing of a three-dimensional object, the method comprising sequentially forming a plurality of layers in a configured pattern corresponding to the shape of the object, thereby forming the object, wherein the formation of each of at least a few of said layers comprises dispensing at least one formulation, and exposing the dispensed formulation to a curing condition to thereby form a cured modeling material, wherein said at least one formulation comprises the formulation of claim 1.

13. The method of claim 12, wherein the formation of each of at least a few of said layers comprises dispensing at least two formulations, and exposing the dispensed formulations to a curing condition to thereby form a cured material, and at least one another of said formulations is a second modeling material formulation which differs from said first formulation by at least one of HDT, Izod Impact and elastic moduli.

14. The method of claim 13, wherein the formation of each of at least a few of said layers comprises dispensing at least said first and said second formulations to form a core region using the first formulation and at least one envelope region at least partially surrounding said core region using said second formulation.

15. An object obtainable by the method of claim 12.

16. A method for preparing the formulation according to claim 1, the method comprising contacting a dispersion of said silica particles and said first multi-functional curable material with said second multi-functional curable material and said monofunctional curable material.

17. The formulation of claim 1, wherein said silica particles are pre-dispersed in said first multi-functional curable material.

18. The formulation of claim 1, wherein each of said curable materials is a UV-curable material.

19. The formulation of claim 18, further comprising a photoinitiator or a photoinitiator system.

20. The formulation of claim 1, further comprising a surface active agent.

* * * * *